(12) United States Patent
Endo et al.

(10) Patent No.: US 6,606,085 B1
(45) Date of Patent: Aug. 12, 2003

(54) COORDINATE INPUT DEVICE

(75) Inventors: Michiko Endo, Tokyo (JP); Takashi Arita, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 145 days.

(21) Appl. No.: 09/616,968

(22) Filed: Jul. 14, 2000

(30) Foreign Application Priority Data

Sep. 22, 1999 (JP) .......................................... 11-269377
Apr. 13, 2000 (JP) ...................................... 2000-112698

(51) Int. Cl.[7] ............................................. A44B 21/00
(52) U.S. Cl. .................. 345/161; 345/159; 74/471 XY
(58) Field of Search ................................. 345/156, 159, 345/160, 161; 324/253, 207.2; 310/10; 341/20; 463/37; 74/471 XY

(56) References Cited

U.S. PATENT DOCUMENTS

| 3,331,972 | A | * | 7/1967 | Moller ........................ 310/10 |
| 5,432,530 | A | * | 7/1995 | Arita et al. ................. 345/159 |
| 5,526,022 | A | * | 6/1996 | Donahue et al. ............ 324/253 |
| 5,619,195 | A | * | 4/1997 | Allen et al. .................... 341/20 |
| 5,714,980 | A | * | 2/1998 | Niino .......................... 345/160 |
| 5,969,520 | A | * | 10/1999 | Schottler .................. 324/207.2 |
| 6,001,014 | A | * | 12/1999 | Ogata et al. ................... 463/37 |
| 6,232,959 | B1 | * | 5/2001 | Pedersen ..................... 345/161 |
| 6,239,785 | B1 | * | 5/2001 | Wallace et al. ............. 345/156 |
| 6,266,046 | B1 | * | 7/2001 | Arita .......................... 345/156 |

FOREIGN PATENT DOCUMENTS

| JP | 58-66381 | 4/1983 |
| JP | 8-339258 | 12/1996 |
| JP | 11-224570 | 8/1999 |

* cited by examiner

*Primary Examiner*—Steven Saras
*Assistant Examiner*—Uchendu O. Anyaso
(74) *Attorney, Agent, or Firm*—Staas & Halsey LLP

(57) ABSTRACT

A three-dimensional coordinate input device includes an operation portion, a ferrite magnet provided within the operation portion, two pairs of Hall-effect elements provided on a substrate. One pair of the Hall-effect elements is used for detecting an X coordinate and the other pair of the Hall-effect elements is used for detecting a Y coordinate. When inclined and vertically moved by hand, the operation portion can be displaced in three-dimension. When the operation portion is inclined in any direction, an XY coordinate value can be obtained based on its inclination and inputted into a computer to be displayed on a coordinate space. By using a mean of output voltages of the Hall-effect elements, a Z coordinate value can be obtained and displayed on the coordinate space.

18 Claims, 22 Drawing Sheets

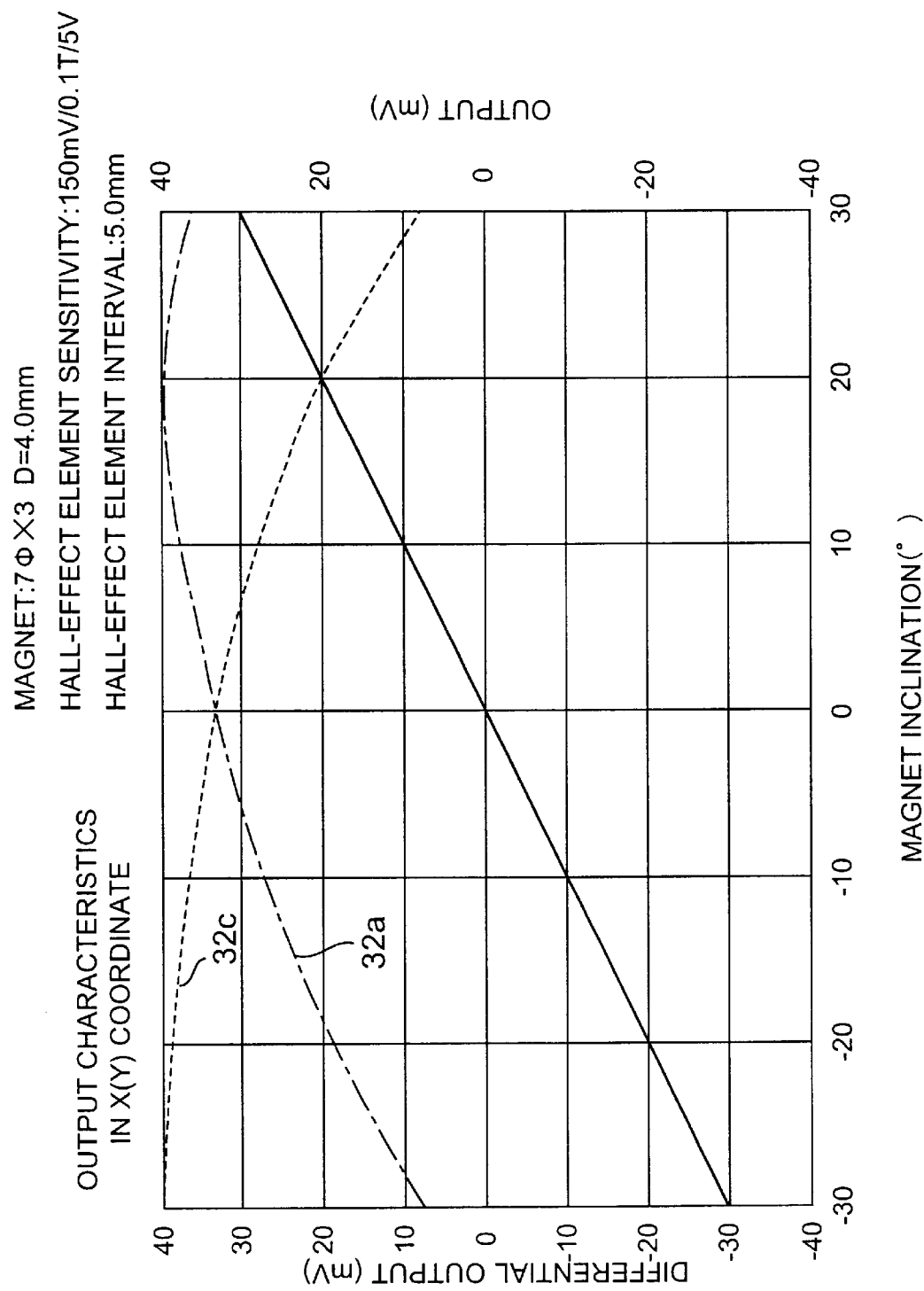

F I G. 1 0
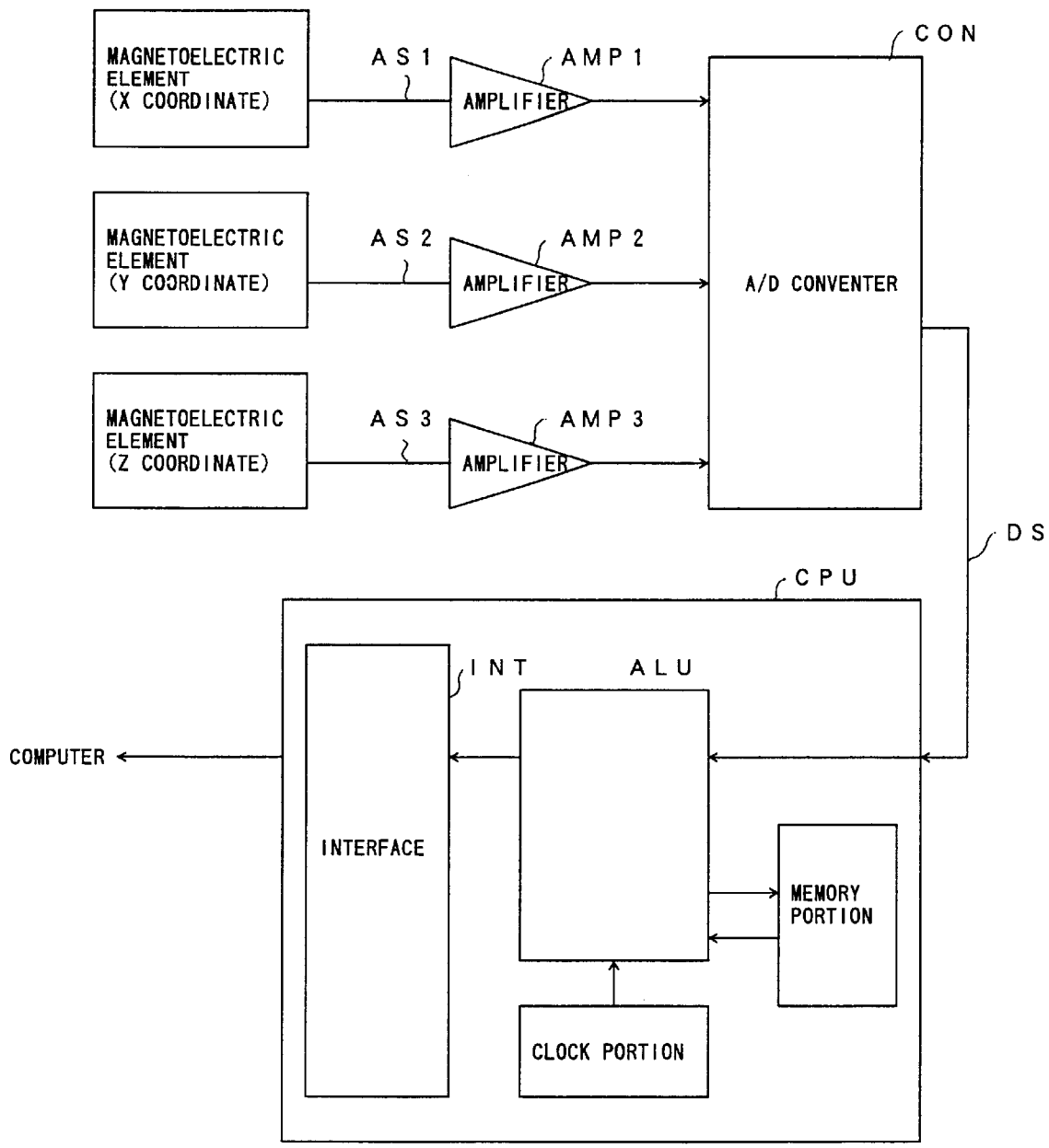

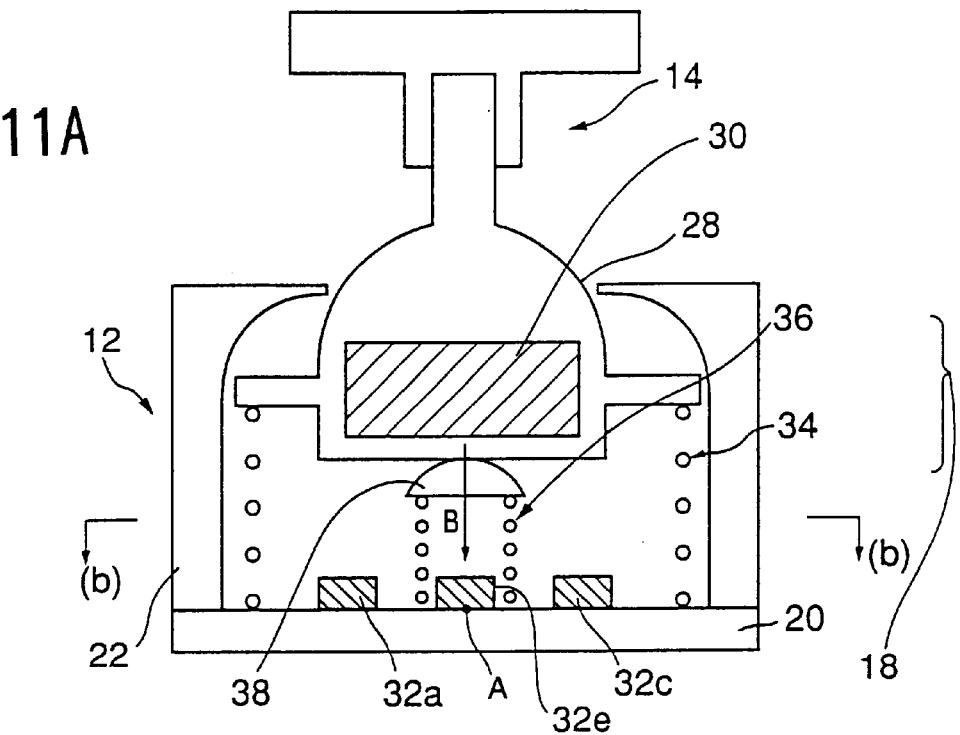
FIG. 11A
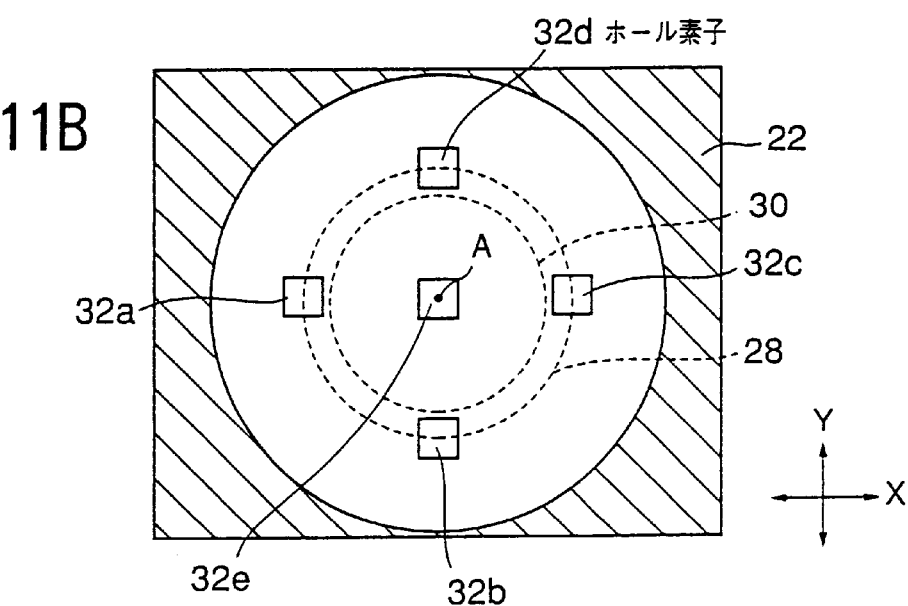
FIG. 11B  32d ホール素子

MAGNETIC RESISTANCE VARYING CHARACTERISTIC OF MAGNETIC RESISTANCE ELEMENT

OUTPUT CHARACTERISTIC OF X(Y) COORDINATE

MAGNET:3.5Φ×2.5 D=4mm
MAGNETIC RESISTANCE ELEMENT
SENSITIVITY:2mV/0.1T/5V

COORDINATE INPUT DEVICE

BACKGROUND OF THE INVENTION

1. Field of the Invention

The present invention generally relates to coordinate input devices, and more particularly to a coordinate input device that is capable of performing a three-dimensional input without a special operation space.

2. Description of the Related Art

As input means of computers, besides keyboards, pointing devices are very popular because of good operation thereof. For example, the pointing devices such as a mouse, digitizer and the like are suitable for desk-top computers.

In recent years, with the spread of notebook computers that are suitable to use in outdoors or in cars, it brings about a problem that the mouse, the digitizer and the like that need a special operation space become inconvenient for use of the note-book computers.

In order to solve the above-mentioned problem, conventionally, a pointing device is developed that is capable of detecting an inclination angle by inclining an operation portion thereof.

A description of such a conventional pointing device is given below with reference to FIGS. 1 through 4.

Reference numeral 1 represents the conventional pointing device, which comprises an operation portion 2, a pressing portion 3 and a coordinate detection portion 4.

The operation portion 2 includes a key top 2a, a stick 2b and a semi-spherical holder 2c. As can be seen from FIG. 1, the stick 2b consists of a cylindrical portion 2b-1, a semi-spherical portion 2b-2 and a protruding portion 2b-3. The cylindrical portion 2b-1 has one end fixed in the key top 2a and the other end formed integrally with the semi-spherical portion 2b-2. The semi-spherical portion 2b-2 and the semi-spherical holder 2c are joined together to form a sphere. The protruding portion 2b-3 protrudes sidewise from the bottom portion of the semi-spherical portion 2b-2.

Further, the operation portion 2 has the semi-spherical portion 2b-2 accommodated in a container consisting of an upper cover 5a and a housing 5b. The upper cover 5a has a central opening 5a-1. The housing 5b has an upward-projecting portion 5b-1 and a concave portion 5b-2 formed on the upward-projecting portion 5b-1. The semi-spherical portion 2b-2 is engaged with the opening 5a-1 of the upper cover 5a, and the semi-spherical portion 2c is supported by the concave portion 5b-2.

The pressing portion 3 consists of a cylindrical slider 3a and a coil spring 3b. The cylindrical slider 3a is configured to be slidable along a side wall 5a-2 of the upper cover 5a. The coil spring 3b has its two ends fixed between the upper cover 5a and the bottom of a concave portion 3a-1 formed in the slider 3a so as to be able to force the slider 3a all the time. The slider 3a has a protruding portion 3a-2 extended toward and around the semi-spherical portion 2b-2 and engaged with the protruding portion 2b-3.

The coordinate detection portion 4 includes a magnet 4a, which is provided within the holder 2c, and four magnetoelectric devices 4b, which are loaded on a printed substrate 6 joined to the bottom of the housing 5b. In addition, as can be seen from FIG. 3, the four magnetoelectric devices 4b are arranged symmetrically with respect to the central axis of the magnet 4a.

According to the previously described configuration of the pointing device 1, by manually operating the key top 2a, the slider 3a is moved upward against the coil spring 3b, and thereby the stick 2b can be inclined to any direction as shown in FIG. 2. At the same time, the magnet 4a mounted within the holder 2c becomes inclined to the magnetoelectric devices 4b fixed on the printed substrate 6.

Next, a description is given below with respect to the principle of how the pointing device 1 detects a coordinate.

In the case where the stick 2b is stood vertically to the printed substrate 6 as shown in FIG. 1, the magnet 4a becomes symmetrically separate from the four magnetoelectric devices 4b (4b-1 through 4b-4 in FIG. 3) as shown by a solid line in FIG. 4. Therefore, magnetic fields applied to the respective magnetoelectric devices 4b-1 through 4b-4 become equal. For example, if a magnetic-field-sensitive direction for detecting the magnetic fields of the magnetoelectric devices 4b-1 through 4b-4 becomes vertical to the printed substrate 6, then magnetic-field-sensitive-direction components B1 through B4 of magnetic flux passing through the magnetoelectric devices 4b-1 through 4b-4 become approximately equal, and output voltages of the magnetoelectric devices 4b-1 through 4b-4 become approximately equal as well.

On the other hand, in the case where the stick 2b is inclined to the printed substrate 6 as shown in FIG. 2, the magnet 4a becomes non-symmetrically separate from the four magnetoelectric devices 4b-1 through 4b-4 as shown by a broken line in FIG. 4. At this time, if the magnet 4a farther approaches to the magnetoelectric device 4b-1 and farther separates from the magnetoelectric device 4b-3, the component B1 becomes larger than the component B3 and in response to this, the output voltages of the magnetoelectric devices 4b-1 and 4b-3 are changed. By calculating an output difference between the magnetoelectric devices 4b-1 and 4b-3, a magnetic inclination θ can be obtained and converted into an X coordinate value for moving a cursor in a display (coordinate space). Similarly, by calculating an output difference between the magnetoelectric devices 4b-2 and 4b-4, a magnetic inclination θ can be obtained and converted into a Y coordinate value.

In other words, whenever the stick 2b is inclined to a direction, an XY coordinate value can be obtained corresponding to the inclined direction or an angle thereof. Accordingly, the thus-obtained XY coordinate value may be inputted into a computer which decides a moving direction, a moving distance and a moving speed of a cursor based on the YX coordinated value so as to display the cursor on a display of thereof.

The conventional pointing device 1, however, is available only for the two dimensional coordinate input in the XY directions but cannot detect information in a Z coordinate direction. As a result, the conventional pointing device 1 cannot perform a three-dimensional coordinate input system that is increasingly required by various complicated software applications.

SUMMARY OF THE INVENTION

It is a general object of the present invention to provide a coordinate input device, in which the above disadvantages are eliminated.

Another and a more specific object of the present invention is to provide a three-dimensional coordinate input device comprising a magnet; a plurality of magnetoelectric elements disposed facing toward the magnet, for generating a first signal detecting an X coordinate value and a second signal detecting a Y coordinated value when the magnet is inclined to the magnetoelectric elements, and for generating a third signal for indicating a Z coordinate value when the magnet is moved vertically to the magnetoelectric elements; and a signal processing portion for processing the first signal, the second signal and the third signal so as to determine an XYZ coordinate value to be displayed on a coordinate space.

Still another object of the present invention is to provide a three-dimensional coordinate input device for indicating a predetermined coordinate point on a coordinate space, comprising an accommodating portion; an operation portion having a build-in magnet; a plurality of magnetoelectric elements; and an elastic member; wherein the accommodating portion includes a substrate serving as a bottom thereof and a case formed integrally with the substrate and having an opening through which the operation portion is moved up and down; the operation portion includes a flat bottom and a projection formed around an outer periphery near to the bottom; the plurality of magnetoelectric elements include four magnetoelectric elements, which are provided on the substrate and are approximately symmetrical with respect to an intersection of the substrate and a magnetic field direction generated from at least one magnetic pole center of the magnet; the elastic member includes a first elastic member engaged between the projection of the operation portion and the substrate, and a second elastic member, stronger than the first elastic member, engaged between the substrate and an approximately semi-sphere which has a curve top surface contacting the bottom of the operation portion and a bottom smaller than the bottom of the operation portion; the operation portion is inclinable and vertically movable, the first elastic member being inclinable during the inclination of the operation portion, the second elastic member being vertically movable during the vertical movement of the operation portion; and an XYZ coordinate point is indicated on the coordinate space based on output voltage variations of the magnetoelectric elements caused by inclining and vertically moving the operation portion.

Other objects, features and advantages of the present invention will become more apparent from the following detailed description when read in conjunction with the accompanying drawings.

BRIEF DESCRIPTION OF THE DRAWINGS

FIG. 6 is a graph for illustrating output characteristics in an X(Y) direction of the coordinate input device of the first embodiment according to the present invention;

FIG. 10 is a block diagram illustrating a signal processing circuit of the coordinate input device of the first embodiment according to the present invention;

FIGS. 11A and 11B are two diagrams for illustrating a coordinate input device of a second embodiment according to the present invention, FIG. 11A being elevational view of the coordinate input device, FIG. 11B being a cross-sectional view of the same along (b)—(b) line of FIG. 5A;

DETAILED DESCRIPTION OF THE PREFERRED EMBODIMENTS

With reference to the drawings, preferred embodiments of the present invention are described below.

First, a description is given with respect to a coordinate input device 10 of a first embodiment according to the present invention, by referring to FIG. 5A through FIG. 9.

Figure 1:
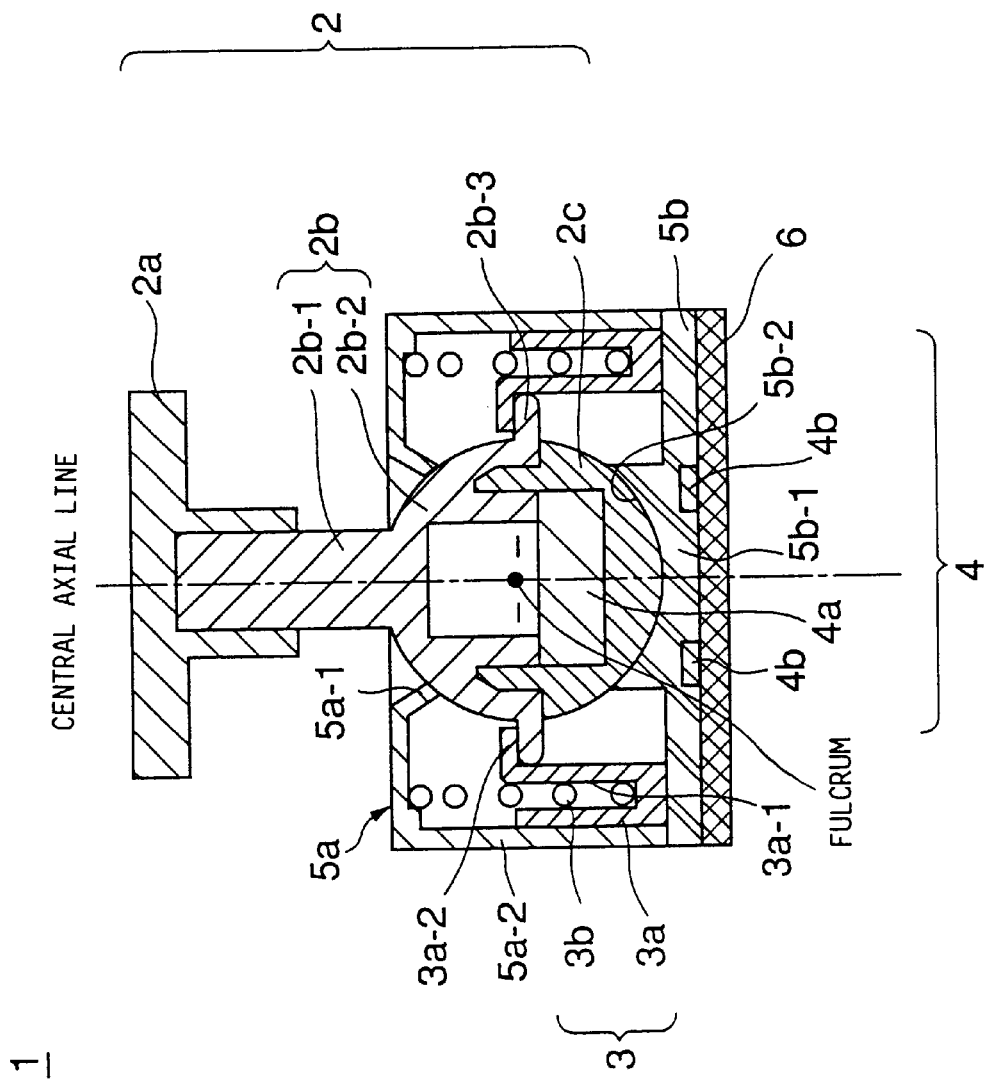
FIG. 1 is an elevational view in section illustrating a state in which an operation portion of a conventional pointing device is vertically stood.
Figure 2:
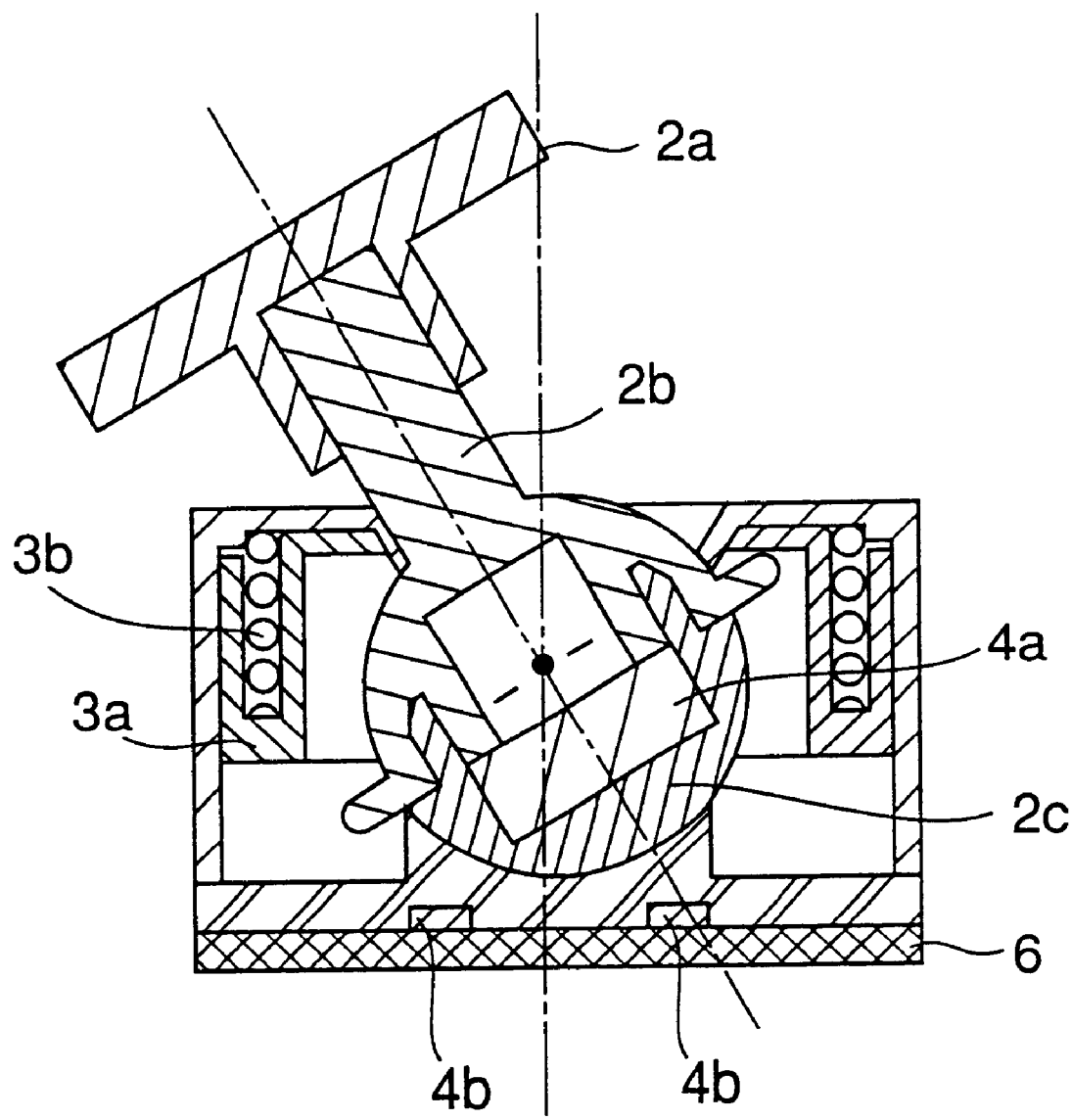
FIG. 2 is an elevational view in section illustrating a state in which the operation portion of FIG. 1 is inclined.
Figure 3:
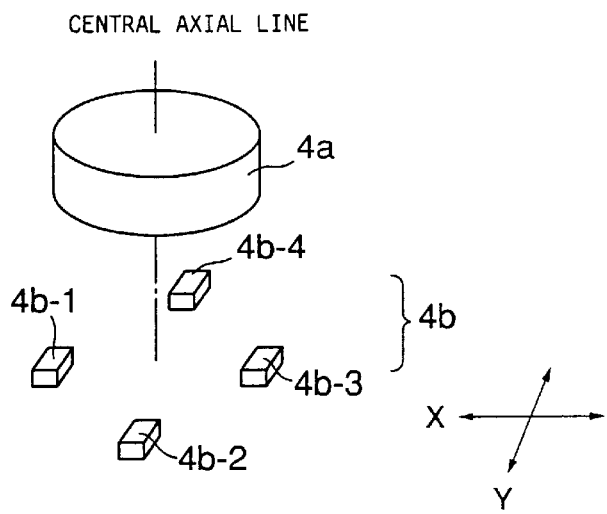
FIG. 3 is a diagram showing a position relationship between a magnet and magnetoelectric devices of the conventional pointing device of FIG. 1.
Figure 4:
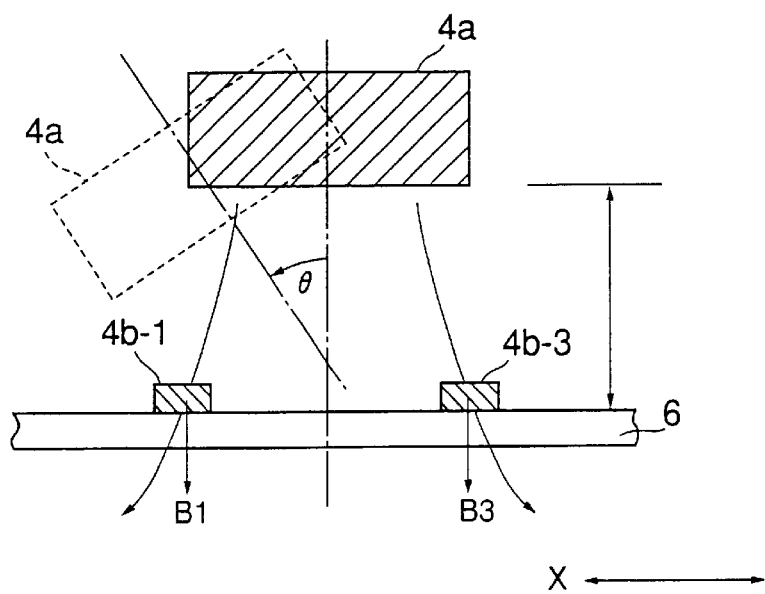
FIG. 4 is a side view of the magnet and the magnetoelectric devices shown in FIG. 3.
Figure 5A:
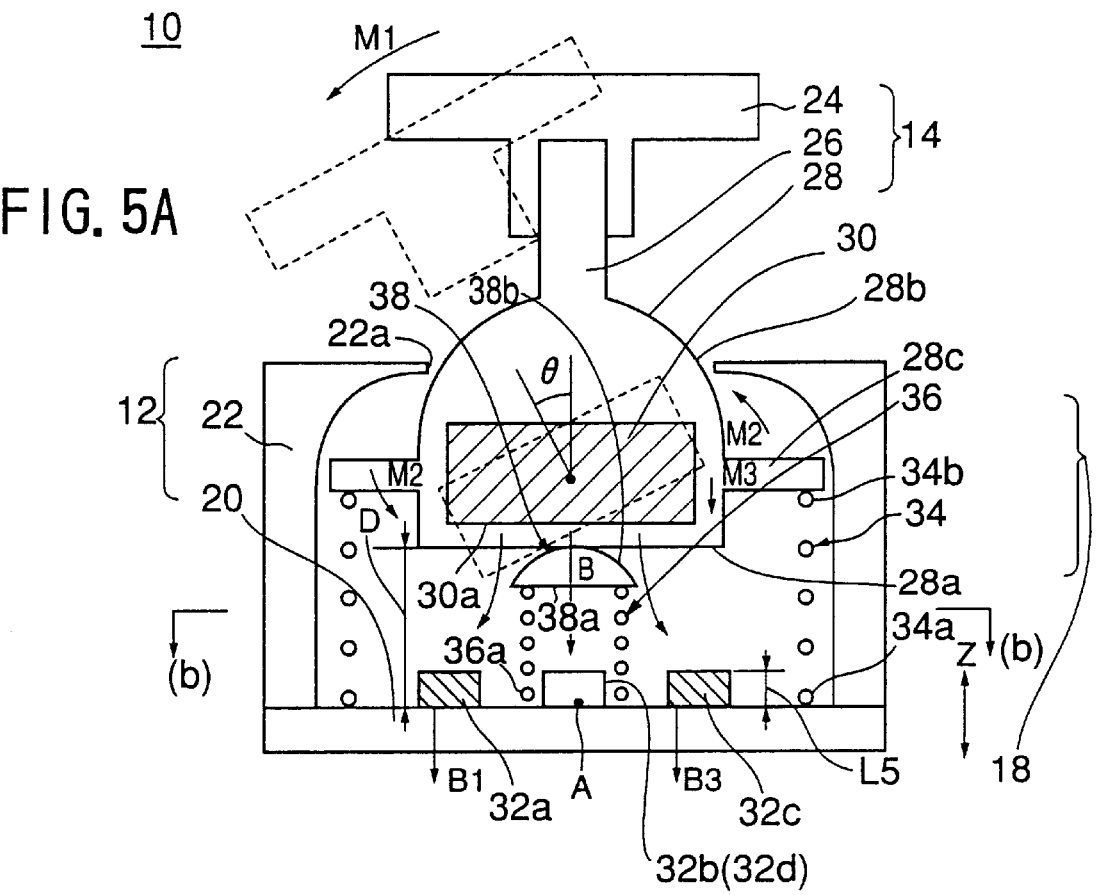
FIGS. 5A and 5B are two diagrams for illustrating a coordinate input device of a first embodiment according to the present invention, FIG. 5A being elevational view of the coordinate input device, FIG. 5B being a cross-sectional view of the same along (b)—(b) line of FIG. 5A.

As shown in FIG. 5A, the coordinate input device 10 comprises an accommodation portion 12, an operation portion 14 having a magnet provided therein, a plurality of magnetoelectric devices 32, and an elastic member 18.

The accommodation portion 12 includes a substrate 20 and a case 22 that are integrally formed. The substrate 20 serves as a bottom surface of the accommodation portion 12. The case 22 serves as side walls and a top surface of the accommodation portion 12. Also, as shown in FIG. 5A, an opening 22a, through which the operation portion 14 can be pushed downward, is formed on the case 22.

As can be seen from FIG. 5A, the operation portion 14 includes an arm 24, a rod 26 and a holder 28. The arm 24 may be operated manually. The rod 26 has one end fixed in the arm 24 and the other end integrally formed with the holder 28 as shown in the diagram. The holder 28, shaped like an approximately semi-sphere, has a circular bottom 28a faced downwards, a curve top surface 28b faced upwards, and a sideward-protruding portion 28c formed near to the bottom 28a and around the curve upper surface 28b. In addition, in this embodiment, the above-mentioned magnet is a cylindrical ferrite magnet 30 with a size of 7 mmØ×3 mmL, which is accommodated in the holder 28 of the operation portion 14. Also, the ferrite magnet 30 has magnetic pole (N pole) 30a facing downward and a magnetic flux of 375 mT (Br).

Figure 5B:
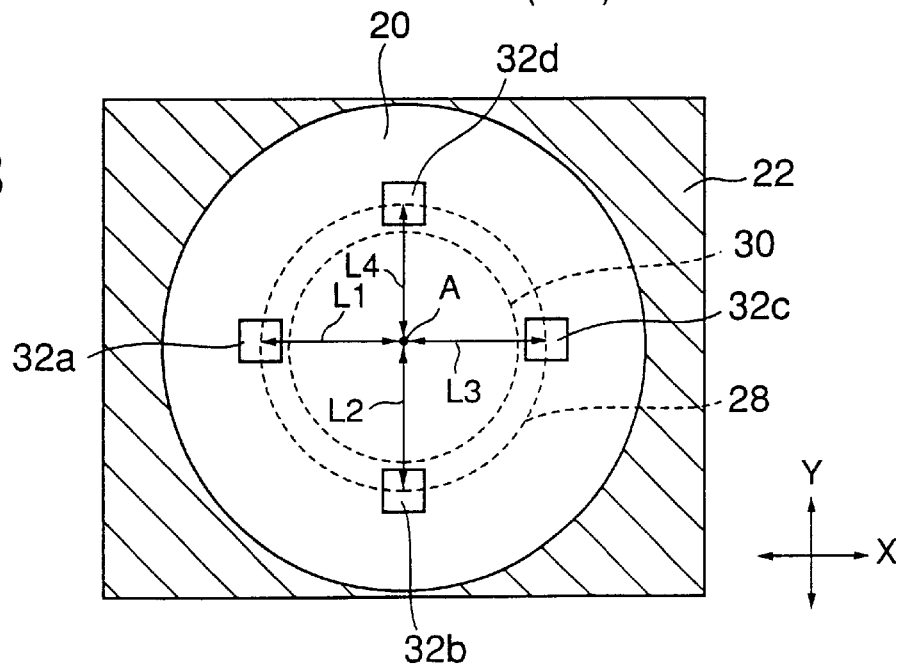

The magnetoelectric devices 32, in this embodiment, includes four Hall-effect elements 32a, 32b, 32c and 32d that are arrange symmetric with respect to an intersection A of the substrate 20 and a magnetic field direction B coming from a center of the magnetic pole of the ferrite magnet 30. As shown in FIG. 5B, distances L1 through L4 denote distances from the intersection A to the center of the four Hall-effect elements 32a through 32d, and are set at, for example, 2.5 mm.

Also, the Hall-effect elements 32a and 32c are used for determining an X coordinate and the Hall-effect elements 32b and 32d are used for determining a Y coordinate. Sensitivities of these Hall-effect elements 32a through 32d are 150 mV/0.1 T/5 V. Magnet sensitive portions for detecting magnetic fields of the Hall-effect elements 32a through 32d are provided on the respective Hall-effect elements 32a through 32d, each being in a position of 0.3 mm (distance L5) from the substrate 20. In this case, a distance D from the substrate 20 to a magnetic pole surface of the ferrite magnet facing toward the substrate is set as 4 mm. According to this configuration, when the operation portion 14 is vertically stood, the magnetic field direction B of the central axis of the ferrite magnet 30 becomes vertical to the substrate 20.

The elastic member 18 includes a first and second coil springs (a first and second elastic members) 34 and 36. The first coil spring 34 has two end portions 34a and 34b which are engaged between the protruding portion 28c and the substrate 20 so as to upward force the protruding portion 28c all the time. The second coil spring 36 has an end portion 36a engaged on a place of the substrate 20 such that the engagement place directly faces toward the bottom surface 28a of the holder 28. The second coil spring 36 is stronger than the first coil spring 34. Also, an engaging member 38 is provided between the second coil spring 36 and the bottom surface 28a of the holder 28. The engaging member 38 is shaped like semi-sphere, which has a circular bottom surface 38a engaging with an end portion 36b of the second coil spring 36 and a curve top surface 38b contacting the bottom surface 28a of the holder 28.

According to this configuration, when the operation portion 14 is manually inclined along an arrow M1, the holder 28 is thereby inclined along the arrow M1. At this time, the protruding portion 28c is moved downward and the first coil spring 34 is shrunk along an arrow M2 on the inclined side, and the bottom surface 28a is in contact with the upper surface 38b of the engaging member 38. When the operation portion 14 is pushed downward by hand, the second coil spring 36 is thereby shrunk and the holder 28 is moved along an arrow M3. Thus, the holder 28 can be three-dimensionally displaced by inclining and pushing downward the operation portion 14.

Instead of the second coil spring 36, using a coned disc spring can bring a good click feeling and is suitable to detect two values that are an ON-value of the operation portion 14 being pushed and an OFF-value of the operation portion 14 being not pushed.

Next, a description is given below with respect to actions of a coordinate detecting mechanism that includes the ferrite magnet 30 and the Hall-effect elements 32a through 32d.

Since the coordinate detecting mechanism is the same as the prior art in detecting X and Y coordinates, the description of the actions thereof is given with respect to how to obtain the X coordinate for example.

When the operation portion 14 is stood vertically to the substrate 20, intervals between the ferrite magnet 30 and the Hall-effect elements 32a and 32c are equal and thereby the magnetic fields applied thereto become equal. Specifically, when a magnetic-field-sensitive direction, used for detecting the magnetic fields of the Hall-effect elements 32a and 32c, becomes vertical to the substrate 20, in the magnetic-field-sensitive direction, components B1 and B3 of magnetic flux passing through the Hall-effect elements 32a and 32c become equal. Thereby, output voltages (outputs) of the Hall-effect elements 32a and 32c become equal when a magnet inclination θ is 0° as shown in FIG. 6.

On the other hand, when the operation portion 14 is inclined to the substrate 20, the intervals between the ferrite magnet 30 and the Hall-effect elements 32a and 32c become unequal. Referring to FIG. 5A, at this time, the magnetic-field-sensitive direction component B1 of the Hall-effect element 32a, to which the ferrite magnet 30 approaches, becomes larger than the magnetic-field-sensitive direction component B3 of the Hall-effect element 32c, from which the ferrite magnet 30 separates. In response to this change, the output voltages of the Hall-effect elements also become unequal. For example, in a case where the magnet inclination θ is 20°, by calculating an output difference (differential output) between the Hall-effect elements 32a and 32c according to FIG. 6, namely, 20 mV=39 mV−19 mV, the magnet inclination θ (θ=20°) can be obtained. Further, the magnet inclination θ can be converted into an X coordinate value which is used for moving a cursor or a pointer on a display. In this case, the output difference has a line relationship with the magnet inclination θ.

Similarly, by calculating an output difference between the Hall-effect elements 32b and 32d, the output difference can be converted into a Y coordinate value.

That is, whenever the operation portion 14 is inclined to any direction by hand, X and Y coordinate values can be obtained based on an inclined direction or an inclined angle. Then, the XY coordinate value is inputted into a computer, where a moving direction, a moving distance and a moving speed of a cursor is determined so that the cursor can be displayed on the display thereof.

Figure 7:
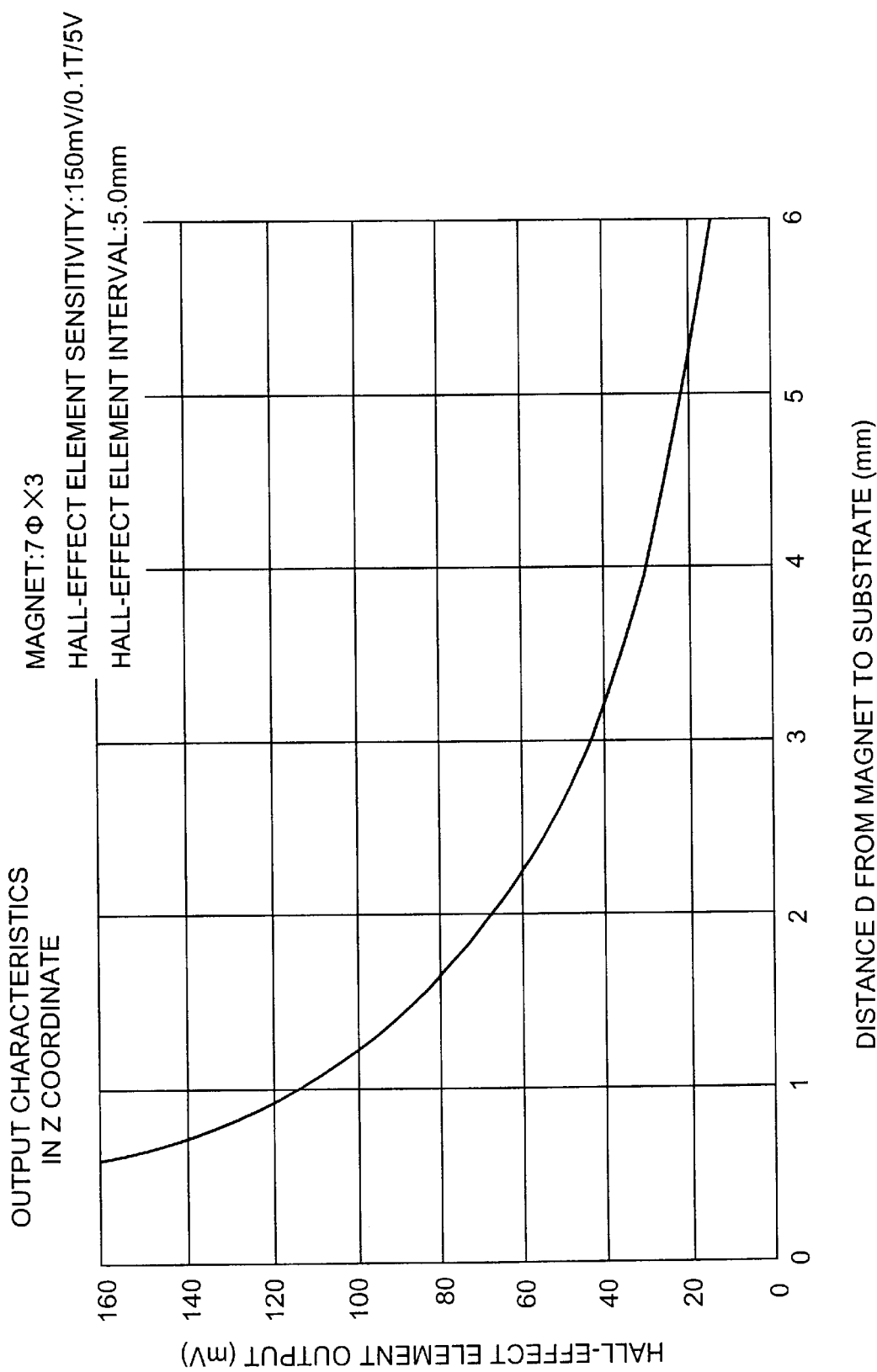
FIG. 7 is a graph for illustrating output characteristics in a Z direction of the coordinate input device of the first embodiment according to the present invention.

With respect to the Z coordinate, when the operation portion 14 is pushed downward and moved vertically to the substrate 20, the ferrite magnet 30 approaches to the four Hall-effect elements 32a through 32d. By such a movement, the magnetic-field-sensitive direction components of the four Hall-effect elements 32a through 32d are increased and the output voltages thereof are increased as well. At this time, when the operation portion 14 is inclined to a direction, the intervals between the ferrite magnet 30 and the four Hall-effect elements 32a through 32d become different from each other. As shown in FIG. 7, there is a curve relationship between mean values of the output voltages of the four Hall-effect elements 32a through 32d and the distances D of the ferrite magnet and the substrate. Accordingly, based on the mean values of the output voltages, a Z coordinate value can be obtained in the same way as that used for obtaining the X and Y coordinate values, and can be displayed on the display of the computer.

Figure 8:
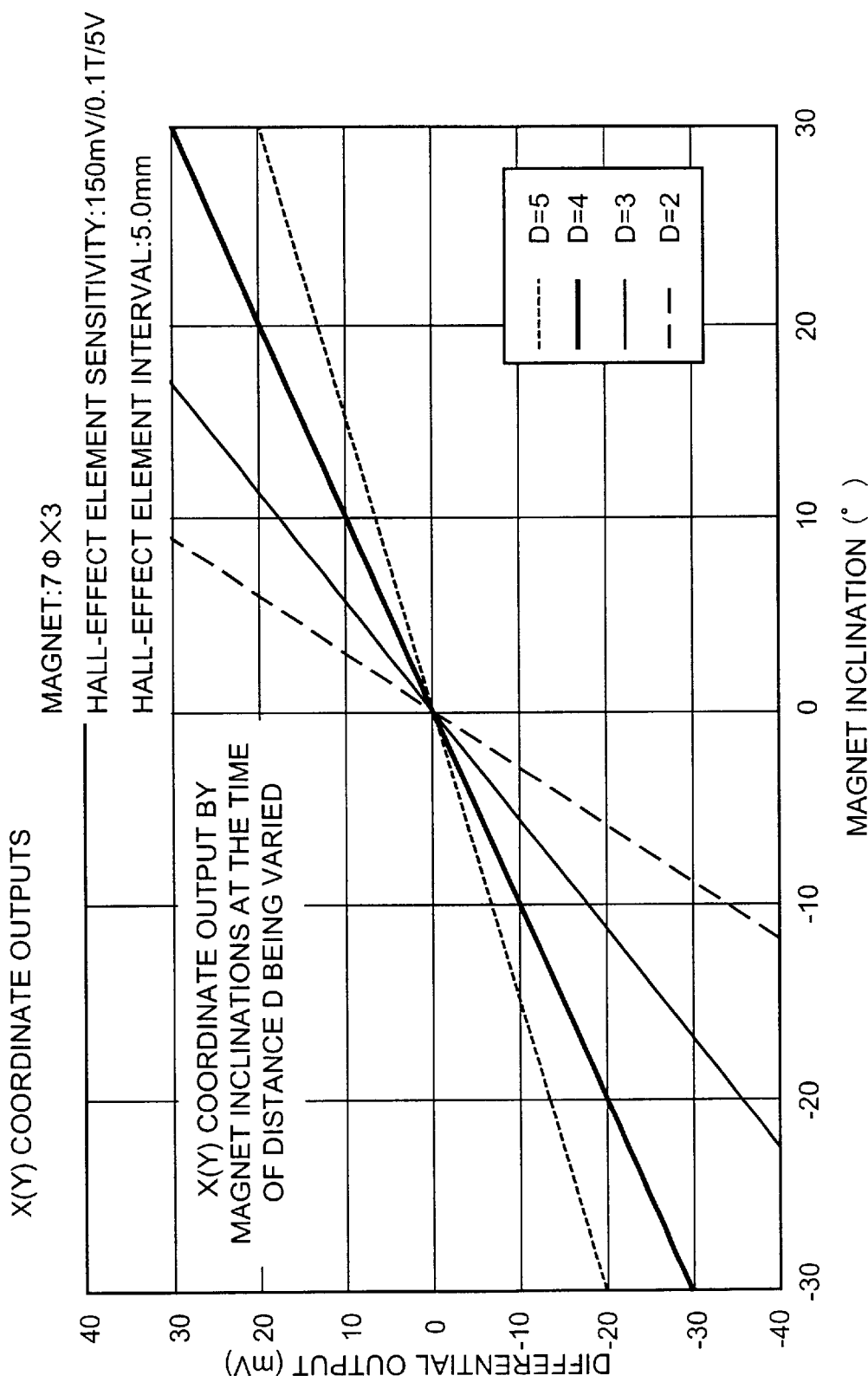
FIG. 8 is a graph for illustrating a relationship between differential outputs in an X(Y) direction and inclinations of the magnet of the coordinate input device of the first embodiment according to the present invention.

Herein, with respect to outputs in the X(Y) direction as shown in FIG. 6, the relationship between the output differences and the magnet inclinations needs to be amended in terms of the state of the operation portion 14 being pushed downward. As can be easily understood from the above description, the relationship between the output difference and the magnet inclination is uncertain as shown in FIG. 8 such that when the distance D between the ferrite magnet 30 and the substrate 20 is varied, the output difference is also varied in response to the varied distance D even if the magnet inclination is kept unvaried. Since the XY coordinate value cannot be determined in one meaning, the output values in the X and Y directions need to be amended based on an output value in the Z direction.

Figure 9:
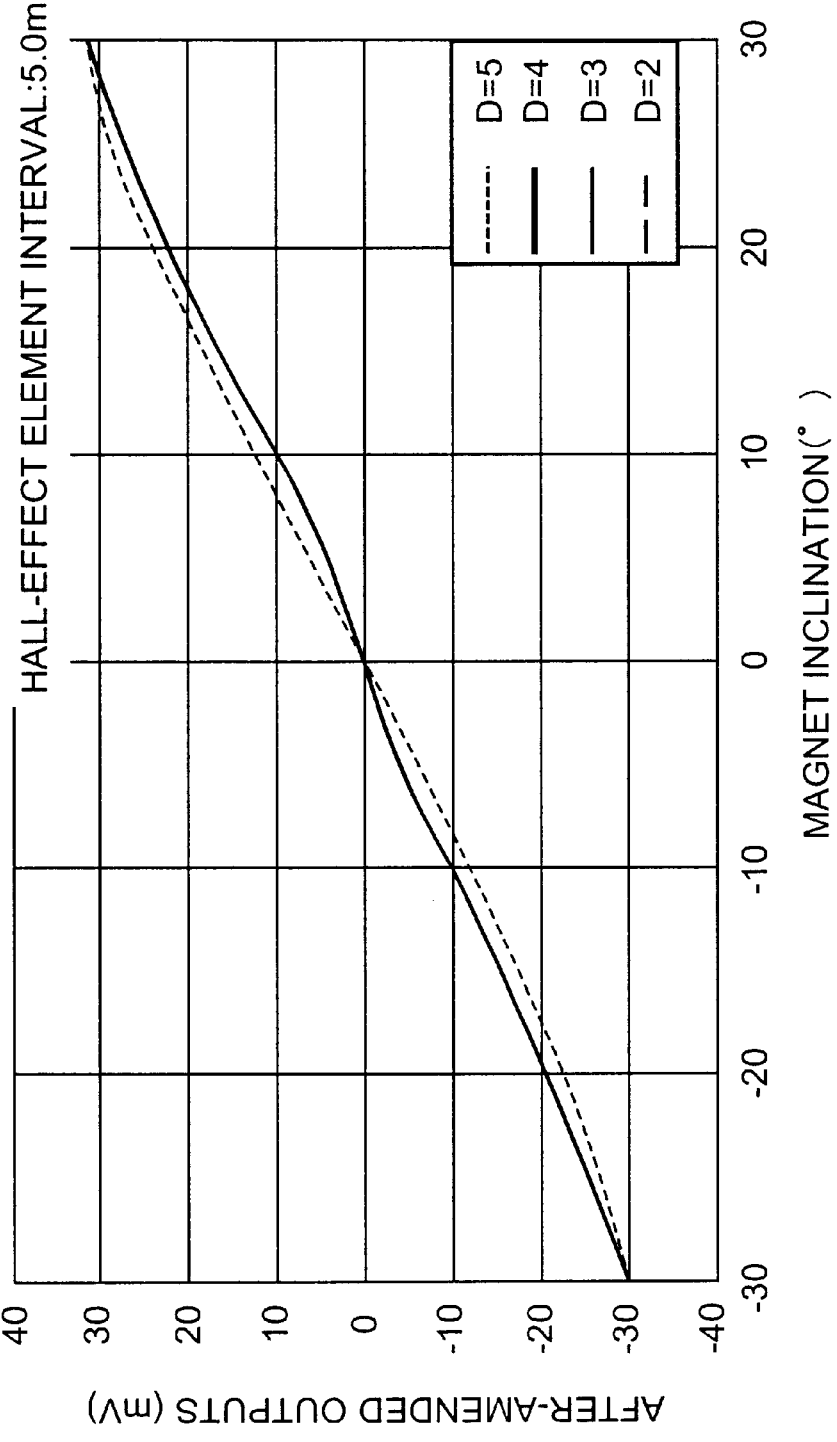
FIG. 9 is a graph for illustrating a relationship between after-amended outputs in an X(Y) direction (after Z-coordinate amendment) and the inclinations of the magnet of the coordinate input device of the first embodiment according to the present invention.

In this embodiment, since a proportion of the output value of the X(Y) direction to that of the Z direction is, for example, 1.3 to 1, by using this proportion, the relationship between the output difference and the magnet inclination can be amended and will not be influenced by the varying of the distance D between the ferrite magnet 30 and the substrate 20. As shown in FIG. 9, the after-amended relationship therebetween can be almost seen like a line. As a result, the influences resulting from pressing the operation portion 14 downward can be eliminated and the XY coordinate value can be determined in one meaning according to the inclined state of the operation portion 14.

Accordingly, the X and Y coordinates can be easily determined by the simple calculation according to the method of FIG. 9, compared to that of FIG. 9 where the X and Y coordinates are separately determined by using their output voltages as parameters.

FIG. 10 shows an example of a signal processing circuit for inputting the thus-obtained X, Y, Z coordinate values.

As shown in FIG. 10, analog signals AS1 through AS3 of the Hall-effect elements corresponding to the X, Y and Z coordinates are amplified by amplifiers AMP1 through AMP3, respectively. Then, the amplified analog signal AS1 through AS3 are sent to an A/D converter where they are converted into a digital signal DS. The digital output signal DS is outputted to a central processing unit (CPU) where the above-mentioned output-value amendment is performed at an arithmetic unit (ALU). Thereafter, the digital signal DS indicating an XYZ coordinate value is, via an interface portion, inputted into a computer where a cursor is displayed on a display according to the XYZ coordinate value indicated by the coordinate input device 10.

According to the previously described configuration of the coordinate input device 10 of the first embodiment, the three-dimensional coordinate input can be realized by using only a few of the Hall-effect elements 32a through 32d and without additional operation space.

Herein, a description is given below with respect to two modifications of the coordinate input device 10 of the first embodiment.

In the first modification, by adjusting the above-mentioned signal process circuit, a threshold value is defined with respect to a detection value of the Z coordinate, displaying the Z coordinate with ON/OFF. Thus, when the Z coordinate is displayed OFF, the detection only for the X and Y coordinates is performed, whereas when the Z coordinate is displayed ON, the detection for the X and Y coordinates is not perform. As a result, the operation portion 14 is pushed downward by a predetermined force, and thereby such a coordinate input can be performed that the cursor is moved forward only along the Z coordinate on the display (coordinate space) when the Z coordinate is ON.

Unlike the first modification where the detection for the X and Y coordinates can be performed when the Z coordinate is ON, in the second modification, the two-dimensional input or the three-dimensional input can be alternatively performed according to a state of pushing downward the operation portion 14.

Next, a description is given below with respect to a coordinate input device 40 of a second embodiment with reference to FIGS. 11A and 11B.

In this embodiment and the others to be described later, parts, which are the same as those used in the first embodiment, are given the same reference numerals, and a description thereof is omitted.

As shown in FIGS. 11A and 11B, the coordinate input device 40 is basically identical with the coordinate input device 10 of the first embodiment. The only difference therebetween is that the coordinate input device 40 further has a Hall-effect element 32e provided on the intersection A with respect to which the Hall-effect elements 32a through 32d are symmetrical as shown in FIG. 11B. The Hall-effect element 32e, with a sensitivity of 150 mV/0.1 T/5 V the same as those of the Hall-effect elements 32a through 32d, includes a magnet sensitive portion provided thereon in a position of 0.3 mm from the substrate 20. In this embodiment, the distance D between the magnet pole surface of the ferrite magnet 30 and the substrate 20 is set at 4 mm.

A coordinate detecting principle of the second embodiment is the same as that of the first embodiment with respect to the X and Y coordinates. That is, by performing an amendment using the amendment proportion (coefficient), regardless of the movement along the Z coordinate, the relationship between the output difference and the magnet inclination (not shown) can be kept the same as that shown in FIG. 9.

Figure 12:
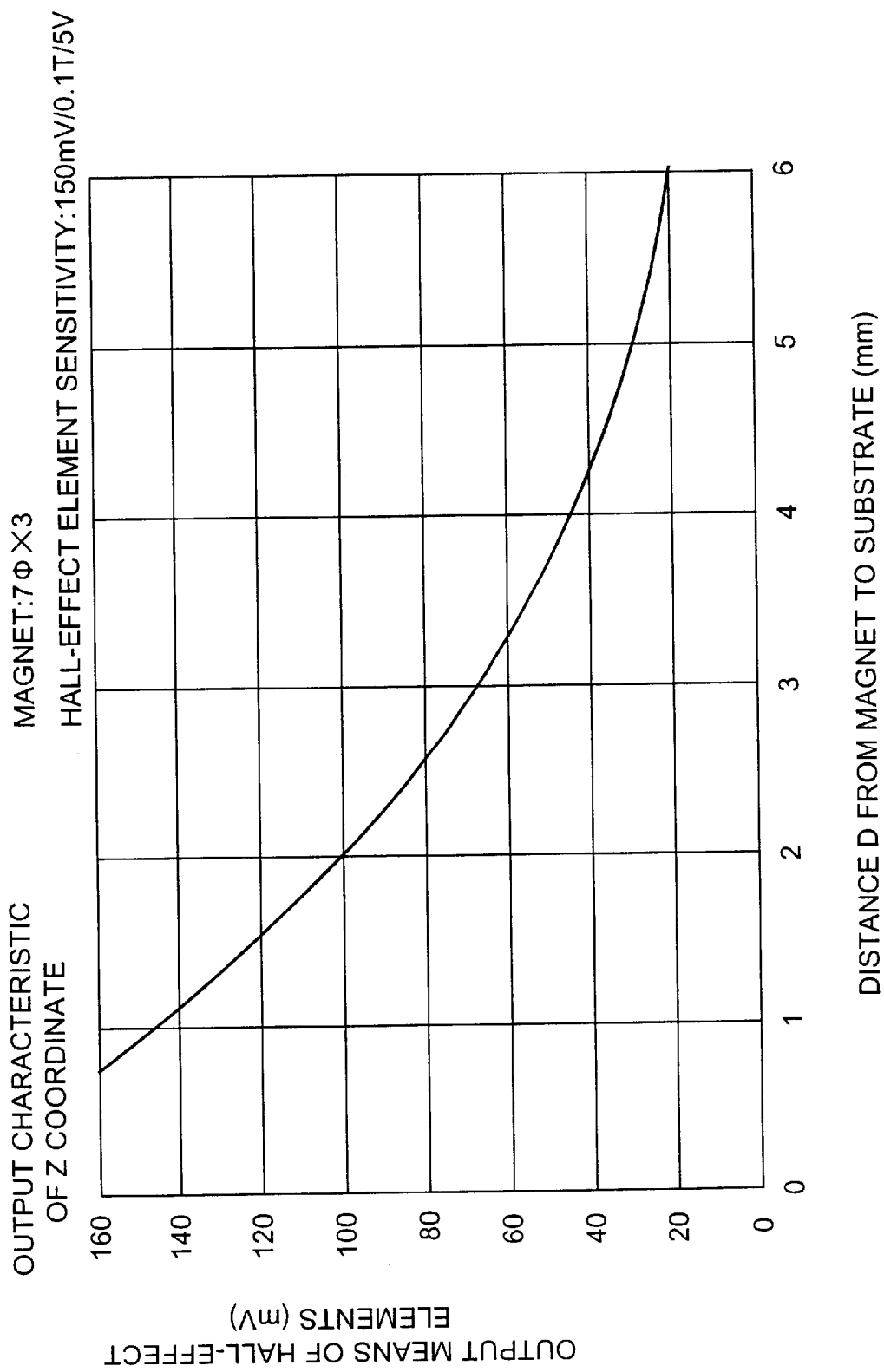
FIG. 12 is a graph for illustrating a relationship between a mean value of the Hall-effect element outputs in the Z coordinate direction and a distance D from the magnet to a substrate of the coordinate input device of the second embodiment according to the present invention.

With respect to the Z coordinate, on the other hand, Z coordinate values can be directly obtained from variations of the output voltage of the Hall-effect element 32e. That is, a certain curve relationship between the output voltage and the distance D from the ferrite magnet 30 to the substrate 20 can be obtained as shown in FIG. 12. Accordingly, unlike the first embodiment where a process is performed in which a mean value of the output voltages of the Hall-effect elements 32a through 32d is calculated, the second embodiment does not need such a process, and as a result time needed by the process can be saved and input operation can be performed quickly.

Next, a description is given below with respect to a first through fourth modifications of the coordinate input device 40 of the second embodiment.

Figure 13:
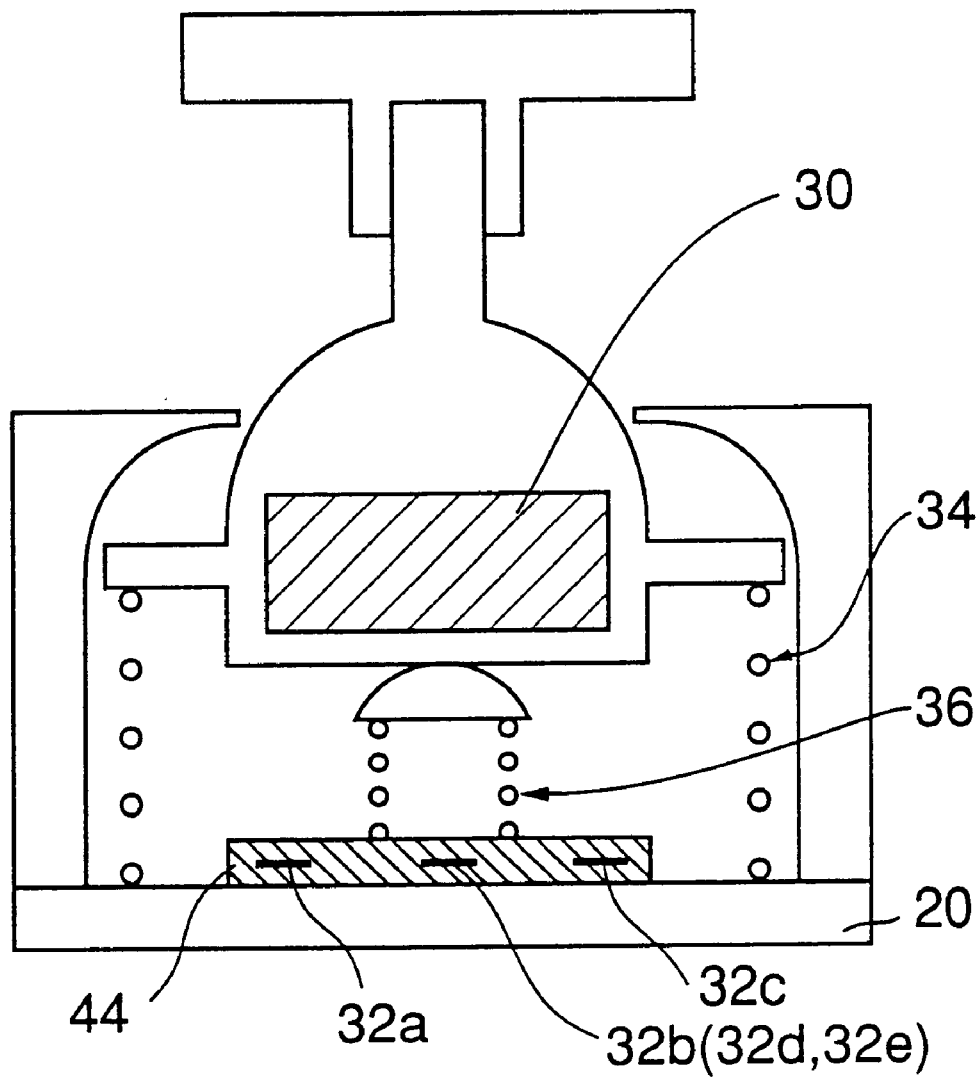
FIG. 13 is an elevational view for illustrating a first modification of the coordinate input device of the second embodiment according to the present invention.

FIG. 13 shows a coordinate input device 42 of the first modification, which comprises the five Hall-effect elements 32a through 32e that are accommodated in a package 44 provided on the substrate 20.

According to this configuration, when the coordinate input device 42 is fabricated, the five Hall-effect elements 32a through 32e to be loaded on the substrate 20 can be regarded as one part because they are accommodated within the package 44. As a result, fabricating time can be saved and positioning accuracy of the Hall-effect elements 32a through 32e can be improved compared to separately positioning the five Hall-effect elements 32a through 32e.

Figure 14:
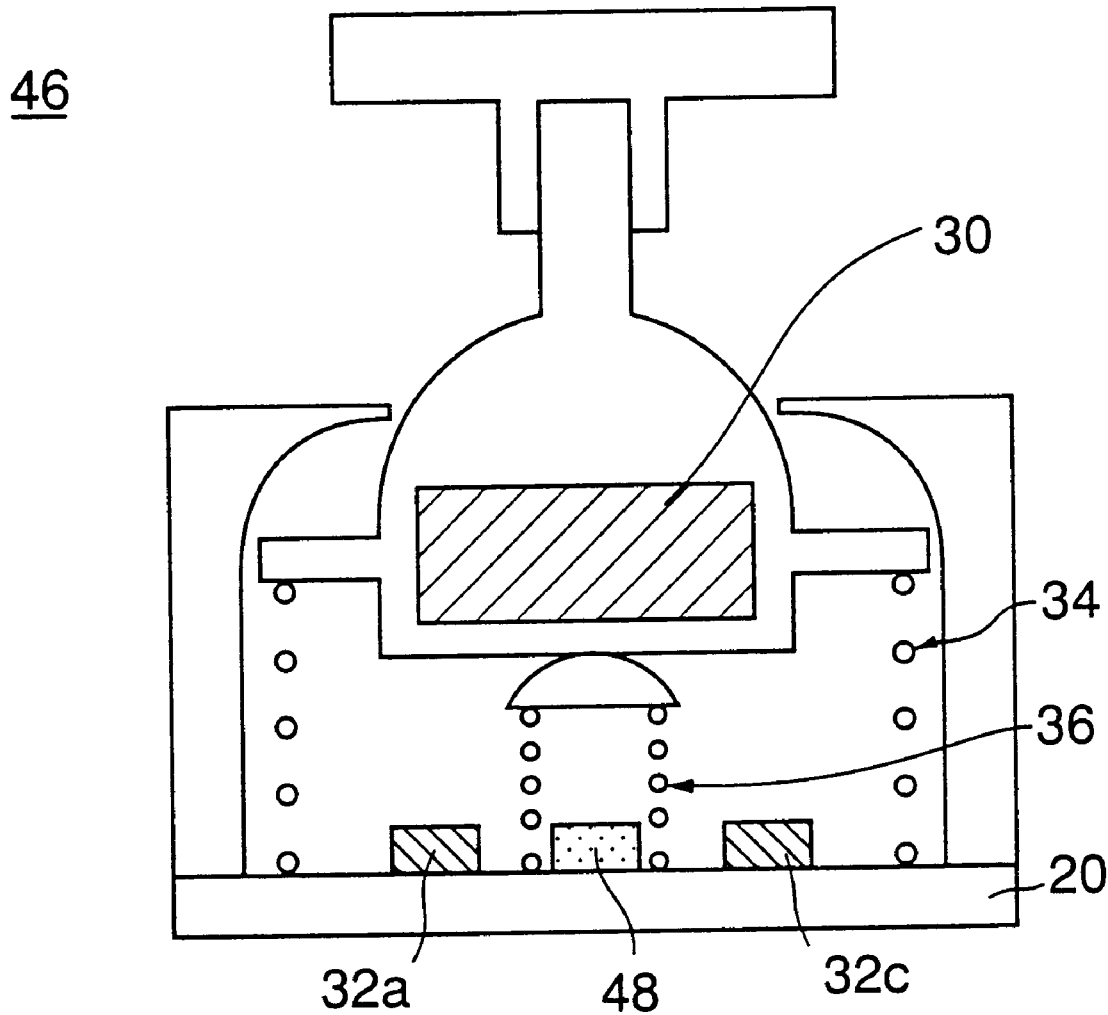
FIG. 14 is an elevational view for illustrating a second modification of the coordinate input device of the second embodiment according to the present invention.

FIG. 14 shows a coordinate input device 46 of the second modification, where a Hall IC 48 is employed instead of the Hall-effect element 32e.

According to this configuration, since the Hall IC itself can output a switch characteristic, the signal processing circuit can be simplified in the case where the output of the Z coordinate is set as ON/OFF value.

Figure 15:
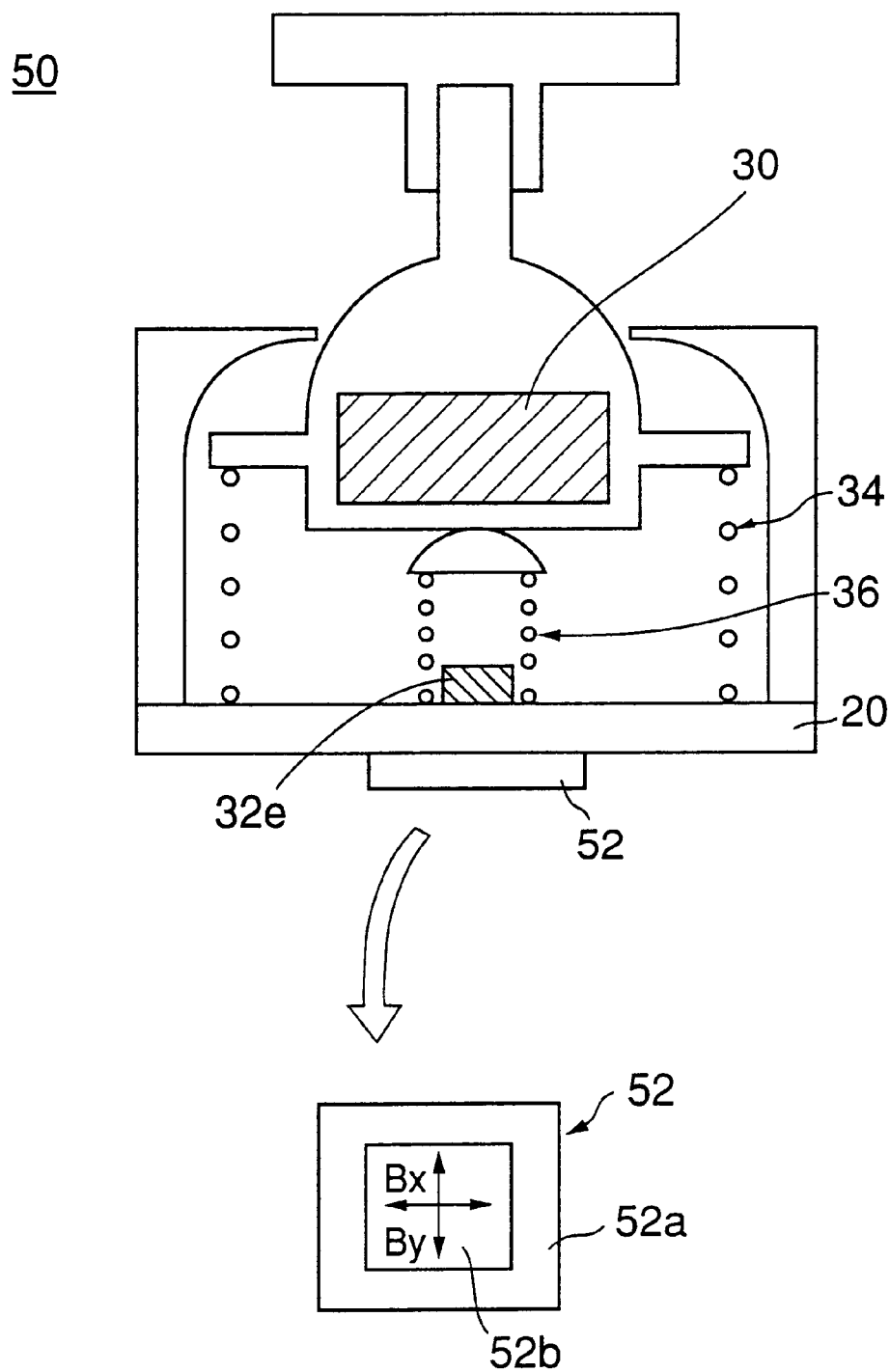
FIG. 15 is an elevational view for illustrating a third modification of the coordinate input device of the second embodiment according to the present invention.

FIG. 15 shows a coordinate input device 50 of the third modification, where a magnetoresistive element 52 is employed instead of the Hall-effect elements 32a through 32d.

The magnetoresistive element 52, which is provided under the substrate 20, is made of a ferromagnetic thin film and includes a square package 52a with a side of 3 mm and a square magnetic-field detecting portion 52b with a side of 2 mm. The magnetic-field detecting portion 52b is provided on the package 52a as shown in FIG. 15.

Also, as shown in FIG. 15, the magnetic-field detecting portion 52b has magnetic-field detection directions Bx and By that are parallel to the magnetoresistive element 52 and are equivalent to the directions X and Y. Therefore, the magnetoresistive element 52 can be mounted at the center of the X and Y coordinates. Moreover, the distance D between the ferrite magnet 30 and the substrate 20 is also set at 4 mm, which is the same as that of the coordinate input device 40. The ferrite magnet has a size of 3 mmø×2.5 mmL. The magnetic-field resistance element has a sensitivity of 2 mV/0.1 mT/5 V.

Figure 16:
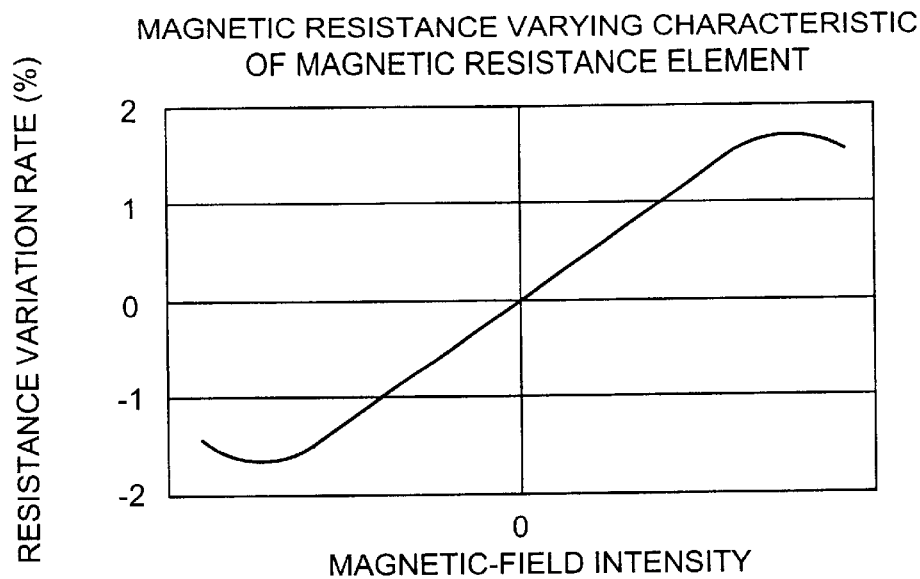
FIG. 16 is a graph illustrating an example of magnetic resistance changing characteristics of a magnetic resistance device.
Figure 17:
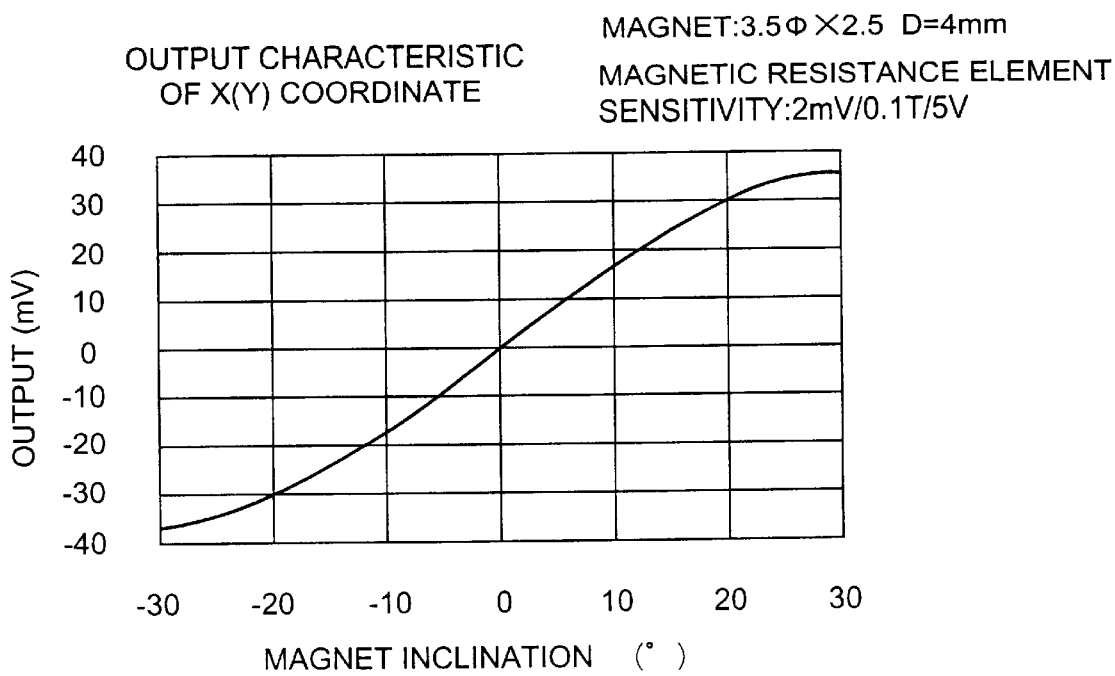
FIG. 17 is a graph illustrating output characteristics in an X(Y) direction of the third modification of the coordinate input device of the second embodiment according to the present invention.

With respect to magnetic fields applied in the magnetic-field detection directions Bx and By, the magnetoresistive element 52 has a magnetic resistance varying characteristic that is shown by FIG. 16 as an example. In this embodiment, when the distance D between the pole surface of the ferrite magnet 30 and the substrate 20 is varied, the output values with respect to the X and Y coordinates are also varied even if the magnetic inclination is kept unvaried. Based on output values of the Hall-effect element 32e for Z-coordinate detection, the output values with respect to the X and Y coordinates can be amended and gathered into an approximately line as shown in FIG. 17.

According to the thus-configured coordinate input device 50 of the third modification, the magnetoresistive element 52 has a larger sensitivity with respect to the magnet field than those of the Hall-effect elements, and a distance between the ferrite magnet and the magnetoresistive element is designed properly long. Therefore, the ferrite magnet 30 can be downsized.

On the other hand, the distance therebetween may be also designed longer.

Also, since the magnetoresistive element 52 is provided under the substrate 20, it can be easily mounted during the fabrication.

Also, in the case of using the Hall-effect element 32e to detect the magnetic field with respect to the Z coordinate, the Hall-effect element 32e needs to be displaced from the center of a place where the Hall-effect elements 32a to 32e are mounted so as to detect magnet inclinations in ± directions. By contrast, in the case of using the magnetoresistive element 52, the magnetoresistive element 52 is mounted centrally and is available for the detection in X and Y coordinates, and therefore an area where the Hall-effect elements mounted on the substrate 20 can be designed smaller. As a result, the coordinate input device can be downsized as a whole.

Figure 18:
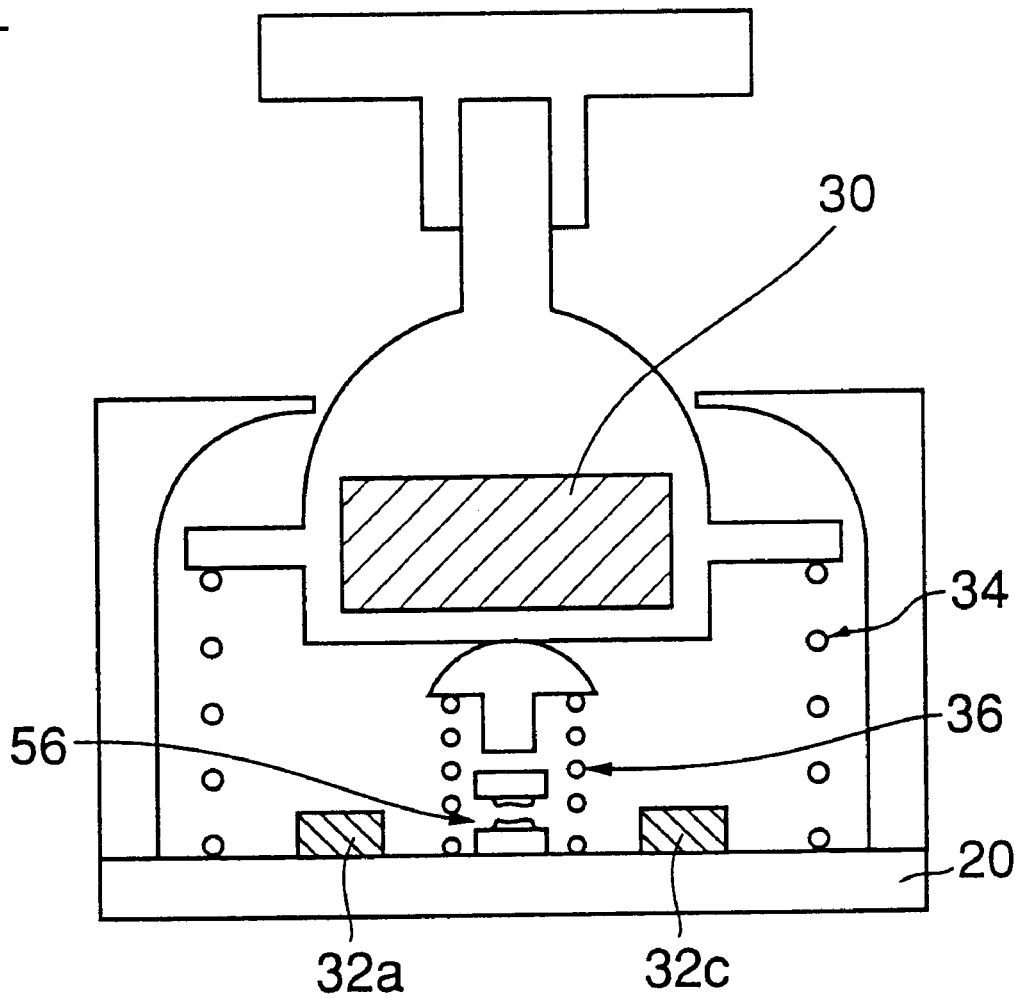
FIG. 18 is an elevational view for illustrating the third modification of the coordinate input device of the second embodiment according to the present invention.

FIG. 18 shows a coordinate input device 54 of the fourth modification, which is provided with a pair of membrane switches 56 as mechanic switches instead of the Hall-effect element 32e.

In this configuration, the signal processing circuit can also be simplified in the case where the output of the Z coordinate is set as an ON/OFF value.

Next, a description is given below in respect of a coordinate input device 58 of a third embodiment by referring to the FIG. 19 through FIG. 23.

Unlike the coordinate input devices and the modifications thereof described in the first and second embodiments where the ferrite magnet 30 is shaped like a cylinder and the Hall-effect elements 32a through 32e are provided under the ferrite magnet, the coordinate input device 58 of the third embodiment has a ferrite magnet 66 shaped like a ring and a plurality of the Hall elements 32a through 32d which are provided inside the magnet 60.

In addition, in this embodiment and a fourth embodiment to be described later, parts, which are the same as those used in the first and second embodiments, are given the same reference numerals, and a description thereof is omitted.

Figure 19A:
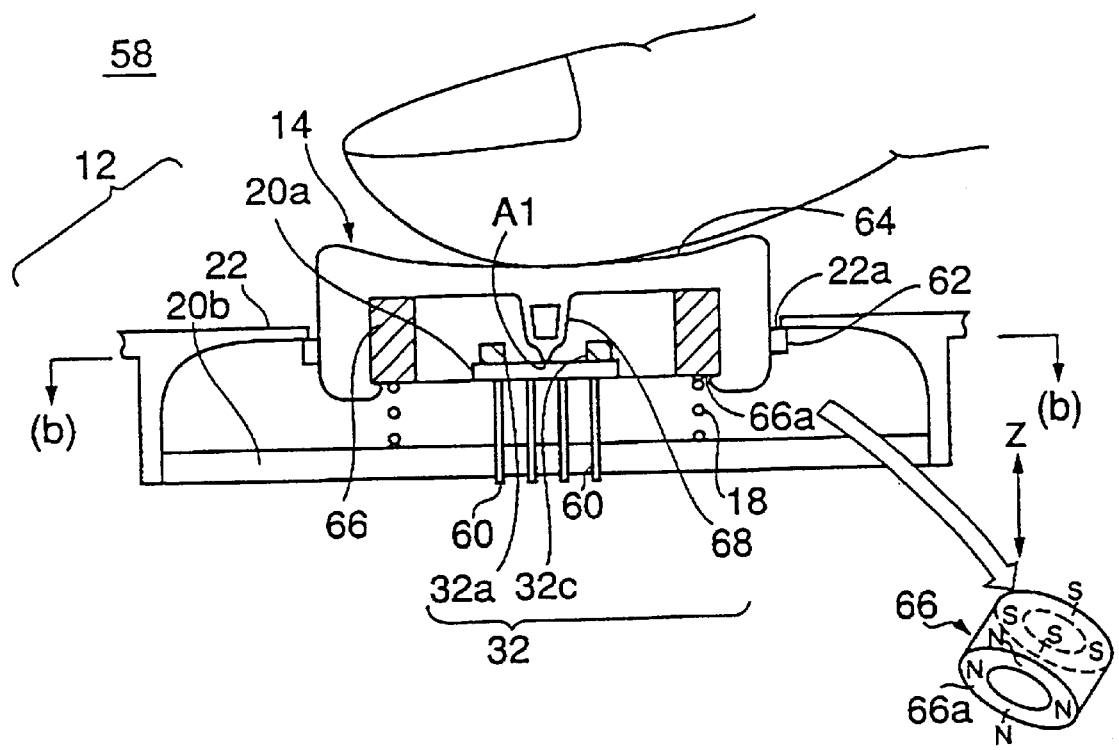
FIGS. 19A and 19B are two cross-sectional diagrams for illustrating a coordinate input device of a third embodiment according to the present invention, FIG. 19A being elevational view of the coordinate input device, FIG. 19B being a cross-sectional view of the same along (b)—(b) line of FIG. 19A.
Figure 19B:
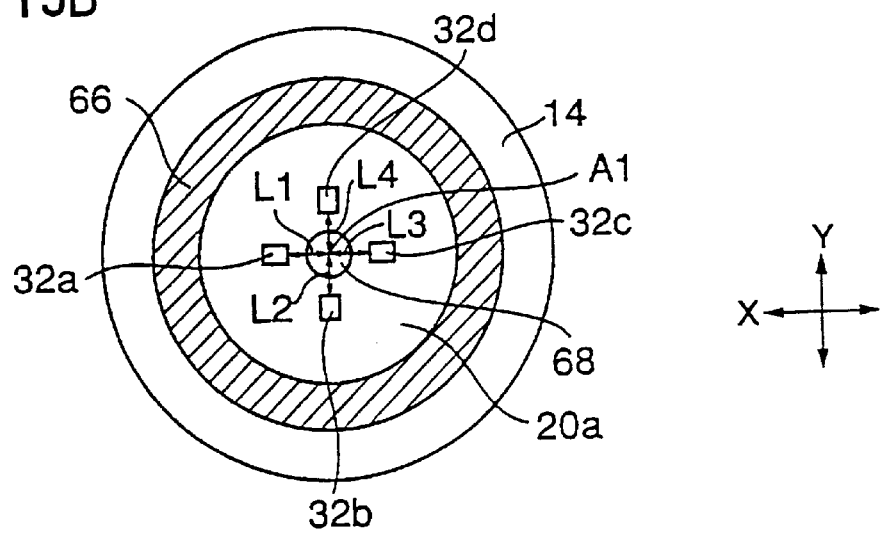
Figure 20:
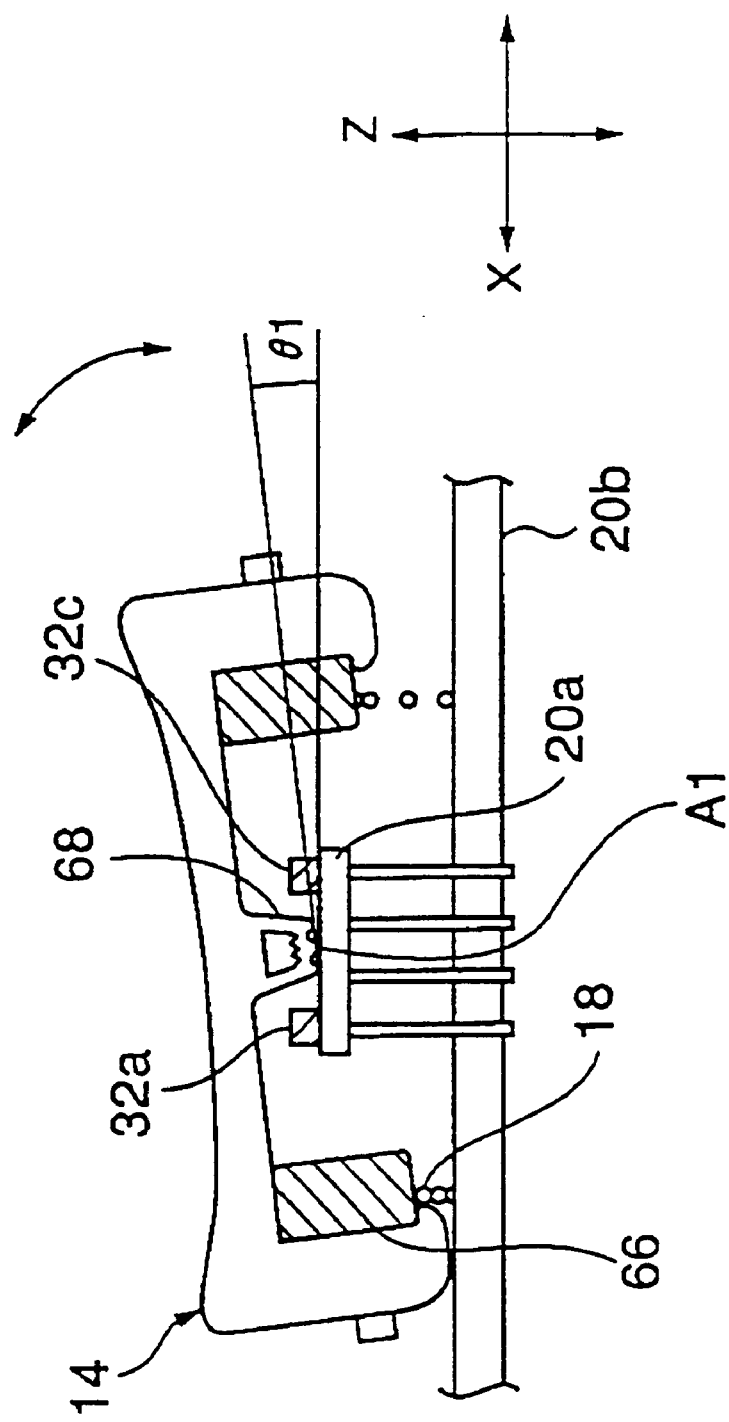
FIG. 20 is a cross-sectional diagram showing a state in which an operation portion of the coordinate input device of the third embodiment is pushed down and inclined to a direction.

As shown in FIGS. 19A and 19B and FIG. 20, the coordinate input device 58 in accordance with the third embodiment comprises the accommodation portion 12, the operation portion within which the ring-shaped ferrite magnet 66 is provided, the plurality of Hall-effect elements 32a through 32d, and the elastic member 18.

The accommodation portion 12 includes a carrying substrate 20a, a circuit substrate 20b and the case 22. As shown in FIG. 19A, the circuit substrate 20b is disposed in a horizontal direction and has its periphery engaged with the case 22 so as to serve as a bottom surface of the accommodation portion 12. Further, the circuit substrate 20b is positioned under the ring-shaped magnet 66, and a plurality of connection terminals 60 each have one end vertically passing through the circuit substrate 20b and the other end on which the carrying substrate 20a is horizontally disposed. The carrying substrate 20a is electrically connected to the circuit substrate 20b via the plurality of connection terminals 60.

The case 22, which is integrated with the circuit substrate 20b, forms a side surface and a top surface of the accommodation portion 12. In addition, the coordinate input device 58, in this embodiment, may be provided on an operation panel of a portable telephone. The case 22 is integrated with a frame body (not shown) that forms the operation panel. The case has the opening 22a from which the operation portion 14 can be moved up and down.

The operation portion 14, which is shaped like a short cylinder, has a top end sealed and a side wall on which a protruding portion 62 is formed and engaged with the top surface of the case 22. Further, the operation portion 14 has a top surface shaped like a shallow dish serving as an operation surface 64 used for fingertip operation. Furthermore, the operation portion 14 has a hollow projection 68 formed under a central portion thereof as shown in the diagram.

The projection 68 has an end contacting a center (intersection A1 to be described later) of the carried substrate 20a. Further, at least, the projection 68 has elasticity, for example, it may be made up of a rubber material and can be elastically deformed by pressure.

In this embodiment, the ring-shaped magnet 66, which is provided on an inside wall of the operation portion 14, has an outer diameter of 12 mmø, an inner diameter of 8 mmø and a thickness of 4 mm, and a magnet pole (N pole) 66a faced downward.

The Hall-effect elements 32a through 32d, serving as the magnetoeletric device 32, are provided in approximately symmetrical positions on the carrying substrate 20a. According to such an arrangement, the Hall-effect elements 32a through 32d becomes approximately symmetrical with respect to the intersection A1 of the carrying substrate 20a and a central line of the ferrite magnet 66 as shown in FIG. 19B. Reference characters L1 through L4 denote distances from the intersection A1 to center points of the respective the four Hall-effect elements 32a through 32d. These distances may be each defined as, for example, 1.5 mm. In the four Hall-effect elements 32a through 32d, the Hall-effect elements 32a and 32c are used for detecting an X coordinate and the Hall-effect elements 32b and 32d are used for detecting a Y coordinate. In addition, these Hall-effect elements 32a through 32d each have a sensitivity of 150 mV/0.1 T/5V.

The elastic member 18 is a coil spring having its two ends engaged between the ferrite magnet 66 and the circuit substrate 20b so as to always force the operation portion 14 upward via the ferrite magnet 14.

As shown in FIG. 20, in the thus-configured coordinate input device 58, when the operation portion 14 is forced along an arrow direction by a force that does not bring about deformation of the projection 68, the intersection A1 serves as a fulcrum and the elastic member 18 is shrunk while the operation portion 14 is inclined. Also, when the operation portion 14 is pushed by a downward force, the projection 68 is deformed in response to the downward force and the operation portion 14 is moved downward. In other words, by pushing and inclining the operation portion 14, the operation 14 can be displaced in a three-dimension of the X, Y and Z directions.

Herein, the actions of a coordinate detecting mechanism that includes the ferrite magnet 66 and the Hall-effect elements 32a through 32d are basically the same as those of other embodiments, and a description thereof is omitted.

Figure 21:
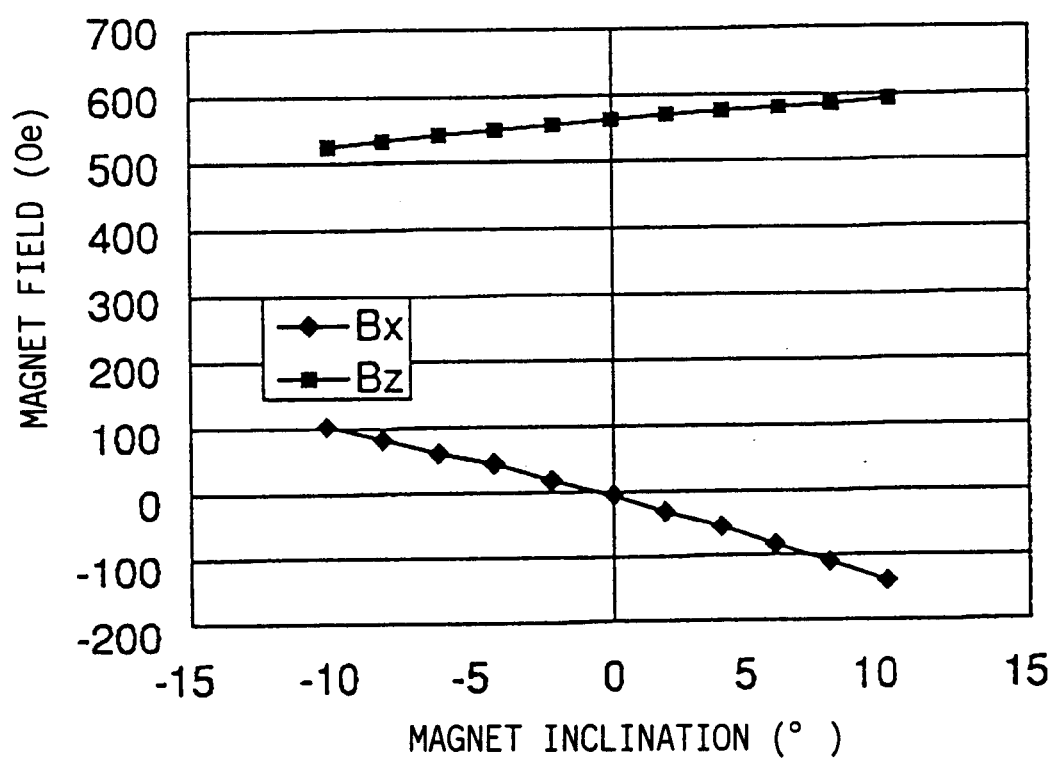
FIG. 21 is a graph illustrating magnetic-field characteristics in the X and Z coordinate directions when the operation portion of the coordinate input device of the third embodiment is inclined to a certain direction.

FIG. 21 is a graph illustrating a relationship between the inclination of the ferrite magnet 66 and the strength of a magnetic field generated by, for example, the Hall-effect element 32c.

Herein, an inclination angle θ1 (see FIG. 20) is formed by a horizontal line and a parallel line with the operation surface 64 (or lower end surface of the ferrite magnet 66), having the counterclockwise direction as a positive direction thereof. As shown in FIG. 20, when the ferrite magnet 66 is inclined to the position direction, the magnetic field in Z coordinate direction Bz is increased and the magnetic field in X coordinate direction Bx is decreased. On the other hand, when the ferrite magnet 66 is inclined to a negative direction (clockwise direction), the magnetic field in Z coordinate direction Bz is decreased and the magnetic field in X coordinate direction Bx is increased. As shown in FIG. 21, a varied amount of the inclination of the ferrite magnet 66 with respect to the magnetic field in the X coordinate direction is larger than that in the Z coordinate direction. In addition, the magnet-field variations in FIG. 21 and FIG. 22 to be described later, in the strict sense of the word, is different from those of the coordinate input device 58 in FIGS. 19A and 19B, and is a simulation result in a case where a contacting point of the projection 68 and the carrying substrate 20a, namely, a rotating center of the operation portion 14 is positioned outside the lower end surface of the ferrite magnet 66 (in a position under the intersection A1 of FIG. 19A).

Figure 22:
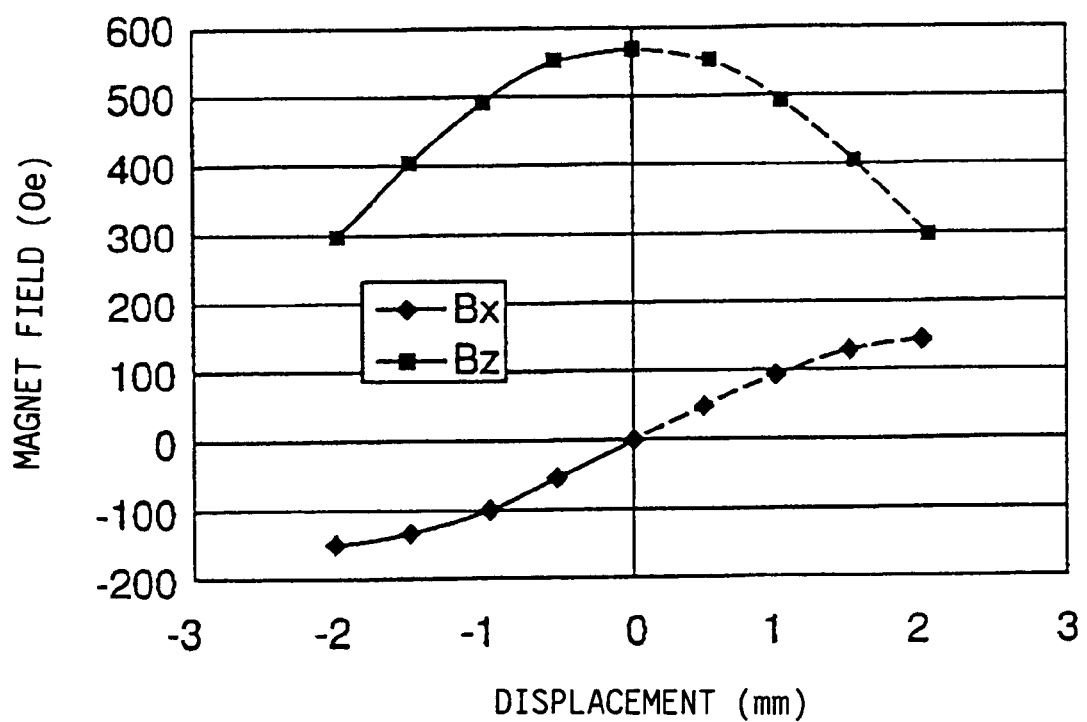
FIG. 22 is a graph illustrating magnetic-field characteristics in the X and Z coordinate directions when the operation portion of the coordinate input device of the third embodiment is pushed downward.

FIG. 22 is a graph illustrating a relationship between displacement of the ferrite magnet 66 in the Z coordinate direction and the magnetic field generated by, for example, the Hall-effect element 32c when the ferrite magnet 66 is pushed downward in the Z coordinate direction.

As shown in this graph, the displacement is zero when the ferrite magnet 66 is in the state of FIG. 19A, and becomes minus when the ferrite magnet 66 is displaced downward in the Z coordinate direction. As can be understood from the graph of FIG. 22, in this case, the magnetic field in the Z coordinate direction (Bz) has the zero as the biggest displacement because there is no plus displacement (shown in broken lines in FIG. 22) in fact. The magnetic field in the X coordinate direction (Bx) is reduced while the ferrite magnet 66 goes down.

Figure 23:
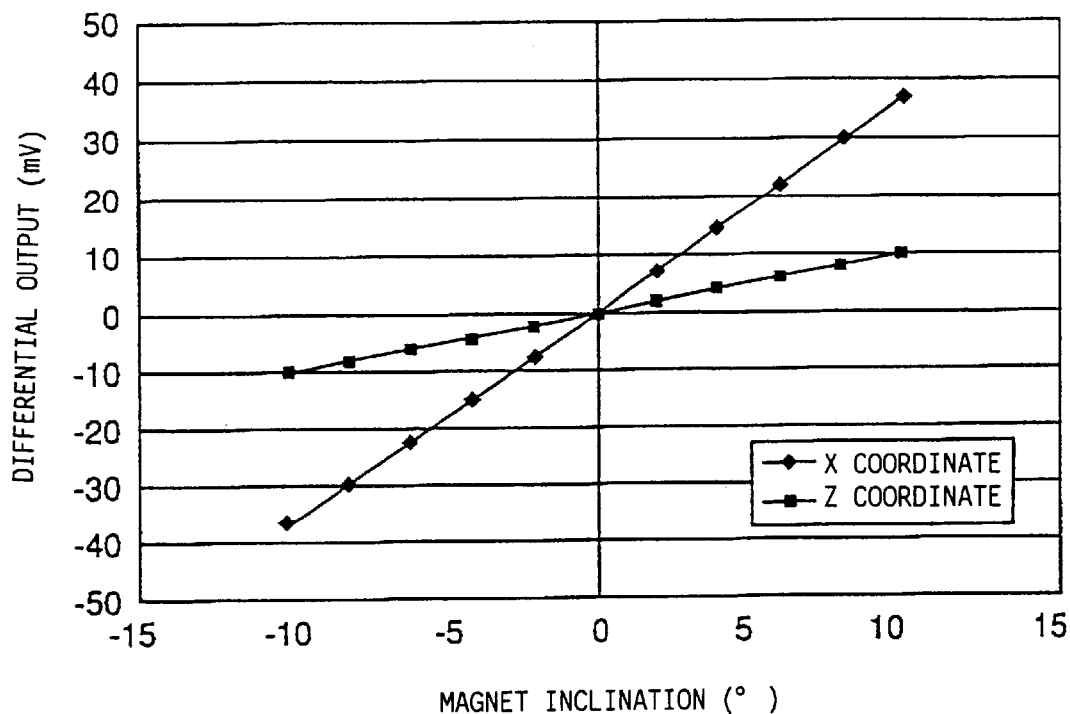
FIG. 23 is a graph illustrating differential output characteristics in the X and Z coordinate directions of the coordinate input device of the third embodiment.

FIG. 23 is a graph illustrating a relationship between the magnet inclination θ1 and the differential output when the ferrite magnet 66 is inclined.

As can be seen from this graph, the differential output is increased while the magnet inclination θ1 is increased. An output curve of the Z coordinate direction is obtained when the magnetic-field detection direction of the Hall-effect elements is made coincident with the Z coordinate direction, being equivalent to that of the embodiment of FIGS. 19A and 19B. An output curve of the X coordinate direction is obtained when the magnetic-field detection direction of the Hall-effect elements is made coincident with the X coordinate direction, being equivalent to that of the embodiment of FIG. 25 to be described later.

According to the coordinate input device 58 of the third embodiment that has been described above, the coordinate input device 58 can be downsized because the Hall-effect elements 32a through 32d are accommodated inside the ferrite magnet 66 and are disposed approximately on one surface with the ferrite magnet 66.

In thus-configured coordinate input device 58, the Hall-effect elements 32a through 32d may be collected within one package so that the package can be disposed near the center of the ferrite magnet 66 instead of separately disposing the four Hall-effect elements 32a through 32d. In this case, the assembling of the coordinate input device 58 can become simple because the four Hall-effect elements 32a through 32d can be treated as one part.

Also, the magnetoresistive element 52 may be employed instead of the Hall-effect elements 32a through 32d. In this case, the magnetoresistive element 52 has its surface direction as the magnetic-field detection direction and therefore has a high sensitivity. Further, the magnetoresistive element 52 has a one-figure higher sensitivity with respect to a low magnetic field than the Hall-effect elements 32a through 32d, and therefore can be produced smaller. As a result, the coordinate input device 58 can be further downsized. For example, the ferrite magnet 66 is molded with an outer diameter of 12 mmø, an inner diameter of 8 mmø and a thickness of 1 mm by using a plastic magnetic material which has a good molding property but is some poor in magnetic characteristics, and thereby even a slight inclination can be detected with high sensitivity.

Next, a description is given below in respect of a modification of the coordinate input device 58 in accordance with the third embodiment by referring to the FIG. 24.

Figure 24:
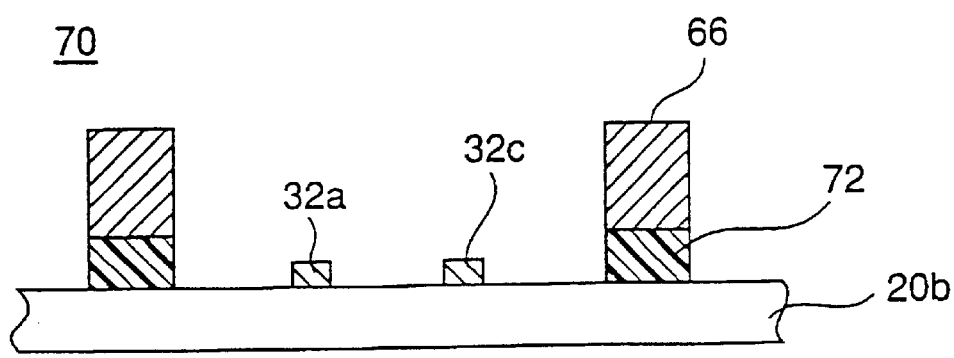
FIG. 24 is a cross-sectional diagram showing a modification of the coordinate input device of the third embodiment.

As shown in FIG. 24, the modification is a coordinate input device 70.

Unlike the coordinate input device 58 where the coil spring serves as the elastic member, the coordinate input device 70 has a ring-shaped elastic member 72 disposed between the ferrite magnet 66 and the circuit substrate 20b.

According to the modified coordinate input device 70, since the thickness of the elastic member 72 can be designed as thin as possible, the modified coordinate input device 70 can be made smaller than the coordinate input device 58.

Figure 25:
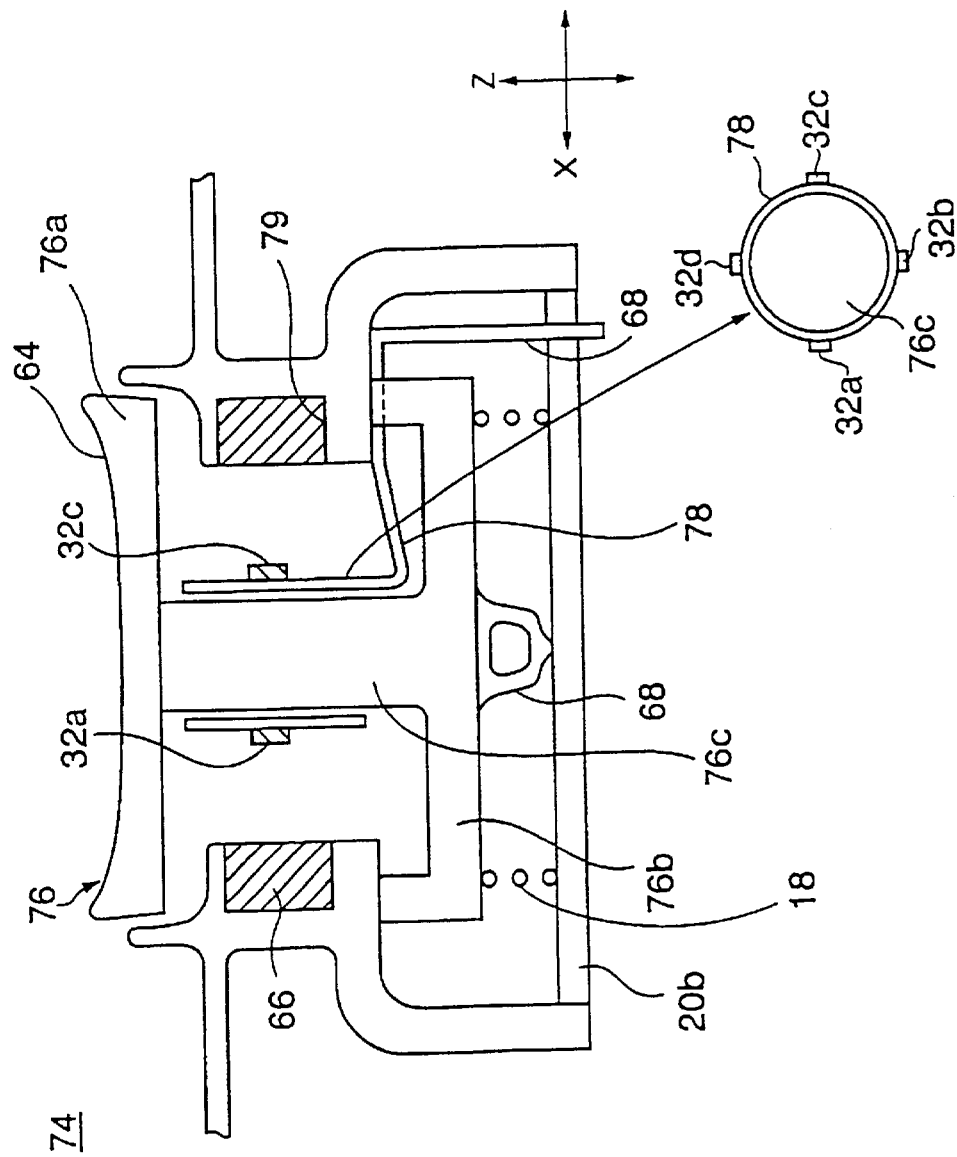
FIG. 25 is a cross-sectional diagram for illustrating a coordinate input device of a fourth embodiment according to the present invention.

Next, a description is given below in respect of a coordinate input device 74 of a fourth embodiment according to the present invention, by referring to FIG. 25.

The coordinate input device 74 is basically configured the same as the coordinate input device 58 of the third embodiment, but has some different points in structure.

Specifically, the coordinate input device 74 comprises an operation portion 76 having an operation plate 76a with the operation surface 64, a lower plate 76b with the hollow projection 68 and an axis 76c serving to connect the operation plate 76a and the lower plate 76b. Also, the coordinate input device 74 comprises a carrying substrate 78, on which the Hall-effect elements 32a through 32d are carried, is a flexible printed plate rolling the axis 76c. Further, the carrying substrate 78 is electrically connected to the circuit substrate 20b via the connecting terminal 68.

The ring-shaped ferrite magnet 66 is fixed in circumferential groove portion 79 as a fixing member formed on the case 22.

Further, unlike the coordinate input device 58, the coordinate input device 74 is configured such that the Hall-effect elements 32a through 32d are vertically disposed inside the ferrite magnet 66.

According to the thus-configured coordinate input device 74, since the Hall-effect elements 32a through 32d are vertically disposed inside the ferrite magnet 66, a varied amount of the magnetic field in the X coordinate direction become large as described in FIG. 21. As a result, as the output curve in the X coordinate direction in FIG. 23, the coordinate input device 74 can detect an inclination of the operation portion 76 with sensitivity higher than the coordinate input device 58 of the third embodiment does.

The above description is provided in order to enable any person skilled in the art to make and use the invention and sets forth the best mode contemplated by the inventors for carrying out their invention.

Although the present invention has been described in terms of various embodiments, it is not intended that the invention be limited to these embodiments. Modification within the spirit of the invention will be apparent to those skilled in the art.

The present application is based on Japanese priority application No. 11-269377 filed on Sep. 22, 1999 and Japanese priority application No. 12-112698 filed on Apr. 13, 2000, the entire contents of which are hereby incorporated by reference.

What is claimed is:

1. A three-dimensional coordinate input device, comprising:
   a magnet;
   a plurality of magnetoelectrical devices, disposed facing toward said magnet, generating a first signal indicating an X coordinate value and a second signal indicating a Y coordinate value, the first and second signals representing output voltage variations of said magnetoelectric devices and being generated when said magnet is inclined towards said magnetoelectric devices, and said magnetoelectric devices generating a third signal indicating a Z coordinate value, the third signal representing an output voltage variation of said magnetoelectric devices and being generated when said magnet is moved vertically towards said magnetoelectric devices; and
   a signal processing portion processing said first, said second and said third signals to determine an XYZ coordinate value to be displayed on a coordinate space.

2. The three-dimensional coordinate input device as claimed in claim 1, wherein:
   said magnet is provided within an operation portion operated manually, a magnetic field direction generated from at least one magnetic pole center thereof being kept approximately vertical when said operation portion is vertically stood;
   said magnetoelectric devices are four magnetoelectric devices provided on a substrate approximately horizontally provided under said magnet, such that said four magnetoelectric devices are approximately symmetrical with respect to an intersection of said magnetic field direction and said substrate;
   said first signal represents an output voltage variation of two of said four magnetoelectric devices, which variation is generated by inclining said operation portion;
   said second signal represents an output voltage variation of the other two of said four magnetoelectric devices, which variation is generated by inclining said operation portion; and
   said third signal represents an output voltage variation of at least two of said four magnetoelectric devices, which variation is generated by pushing downward said operation portion.

3. The three-dimensional coordinate input device as claimed in claim 1, wherein:
   said magnet is provided within an operation portion operated manually, a magnetic field direction generated from at least one magnetic pole center thereof being kept approximately vertical when said operation portion is vertically stood;
   said magnetoelectric devices are five ones, four ones provided on a substrate approximately horizontally provided under said magnet such that said four magnetoelectric devices are approximately symmetrical with respect to an intersection of said magnetic field direction and said substrate, a fifth one provided at or near said intersection;
   said first signal represents an output voltage variation of two of said four magnetoelectric devices, which variation is generated by inclining said operation portion;
   said second signal represents an output voltage variation of the other two of said four magnetoelectric devices, which variation is generated by inclining said operation portion; and said third signal represents an output voltage variation of said fifth magnetoelectric devices, which variation is generated by pushing downward said operation portion.

4. The three-dimensional coordinate input device as claimed in claim 1, wherein:

said magnet is shaped like a ring; and said magnetoelectric devices are disposed inside said ring-shaped magnet.

5. The three-dimensional coordinate input device as claimed in claim 4, wherein:

said magnet is provided within an operation portion operated manually, a magnetic field direction generated from at least one magnetic pole center thereof being kept approximately vertical when said operation portion is vertically stood;

said magnetoelectric devices are four magnetoelectric devices provided on a substrate approximately horizontally provided inside said magnet, such that said four magnetoelectric devices are approximately symmetrical with respect to an intersection of said magnetic field direction and said substrate;

said first signal represents an output voltage variation of two of said four magnetoelectric devices, which variation is generated by inclining said operation portion;

said second signal represents an output voltage variation of the other two of said four magnetoelectric devices, which variation is generated by inclining said operation portion; and said third signal represents an output voltage variation of at least two of said four magnetoelectric devices, which variation is generated by pushing downward said operation portion.

6. The three-dimensional coordinate input device as claimed in claim 4, wherein:

said magnet is provided within an operation portion operated manually, a magnetic field direction generated from at least one magnetic pole center thereof being kept approximately vertical when said operation portion is vertically stood;

said magnetoelectric devices are five magnetoelectric devices, four ones being provided on a substrate approximately horizontally provided inside said magnet such that said four magnetoelectric devices are approximately symmetrical with respect to an intersection of said magnetic field direction and said substrate, a fifth one being provided at or near said intersection;

said first signal represents an output voltage variation of two of said four magnetoelectric devices, which variation is generated by inclining said operation portion;

said second signal represents an output voltage variation of the other two of said four magnetoelectric devices, which variation is generated by inclining said operation portion; and said third signal represents an output voltage variation of said fifth magnetoelectric devices, which variation is generated by pushing downward said operation portion.

7. The three-dimensional coordinate input device as claimed in claim 4, wherein said magnetoelectric devices are approximately vertically disposed inside said magnet.

8. The three-dimensional coordinate input device as claimed in claim 7, wherein:

said magnet is fixed in a fixing member, having a magnetic field direction, which is generated from at least one magnetic pole center thereof, kept approximately vertical;

said magnetoelectric devices are four ones held by an operation portion operated manually, and in a state of said operation portion being stood vertically, said four magnetoelectric devices are provided on a cylindrical substrate approximately vertically provided inside said magnet such that said four magnetoelectric devices are approximately symmetrical with respect to a center of said magnet;

said first signal represents an output voltage variation of two of said four magnetoelectric devices, which variation is generated by inclining said operation portion;

said second signal represents an output voltage variation of the other two of said four magnetoelectric devices, which variation is generated by inclining said operation portion; and said third signal represents an output voltage variation of at least two of said four magnetoelectric devices, which variation is generated by pushing downward said operation portion.

9. The three-dimensional coordinate input device as claimed in claim 3, wherein said signal processing portion uses an amendment coefficient to amend an XY coordination shift caused by pushing downward said operation portion.

10. The three-dimensional coordinate input device as claimed in claim 2, wherein said signal processing portion indicates said Z coordinate value Z by detecting a mean value of output voltage values of said four magnetoelectric devices.

11. The three-dimensional coordinate input device as claimed in claim 3, wherein said signal processing portion provides said Z coordinate value with a threshold value so that said Z coordinate value is detected as an ON/OFF value.

12. The three-dimensional coordinate input device as claimed in claim 1, wherein said magnetoelectric devices are Hall-effect elements.

13. The three-dimensional coordinate input device as claimed in claim 3, wherein said four magnetoelectric devices are Hall-effect elements, and said fifth magnetoelectric device is a pair of mechanical switches provided between said magnet and said substrate.

14. The three-dimensional coordinate input device as claimed in claim 3, wherein said four magnetoelectric devices are Hall-effect elements, and said fifth magnetoelectric device is a Hall-effect IC.

15. The three-dimensional coordinate input device as claimed in claim 3, wherein said magnetoelectric devices are magnetoresistive devices of a ferromagnetic thin film, and said fifth magnetoelectric device is a Hall-effect element.

16. The three-dimensional coordinate input device as claimed in claim 14, wherein said magnetoresistive device of ferromagnetic thin film is provided on a back surface of said substrate.

17. A three-dimensional coordinate input device, comprising:

an accommodating portion;

an operation portion having a magnet built therein;

a plurality of magnetoelectric devices; and an elastic member, wherein said accommodating portion comprises a substrate serving as a bottom of said accommodating portion and a case formed integrally with said substrate and having an opening through which said operation portion is moved up and down, said operation portion comprises a flat bottom and a projection formed around an outer periphery near to said bottom, the plurality of magnetoelectric devices comprises four magnetoelectric devices, which are provided on said substrate and are located approximately symmetrically with respect to an intersection of said substrate and a magnetic field direction from a center of said magnet, said elastic member comprises a first elastic member engaged between said projection of said operation portion and said substrate, and a second elastic member, stronger than said first elastic member, engaged between said substrate and an approximately semi-sphere which has a curved top surface contacting said bottom of said operation portion and a bottom smaller than said bottom of said operation portion, said operation portion is inclinable and is vertically movable, said first elastic member being inclinable during the inclination of said operation portion, said second elastic member being vertically movable during the vertical movement of said operation portion, an XYZ coordinate point is indicated on a coordinate space based on output voltage variations of said magnetoelectric devices generated by inclining and vertically moving said operation portion, and the four magnetoelectric devices generate a first signal indicating an X coordinate value and a second signal indicating a Y coordinate value, the first and second signals representing output voltage variations of said magnetoelectric devices and being generated when said magnet is inclined towards said magnetoelectric devices by using said operation portion, and said magnetoelectric devices generate a third signal indicating a Z coordinate value, the third signal representing an output voltage variation of said magnetoelectric devices and being generated when said magnet is moved vertically towards said magnetoelectric devices by using said operation portion.

18. A method of determining three-dimensional coordinates for a coordinate input device, comprising:

locating magnetoelectric devices adjacent to a magnet;

generating a first signal indicating an X coordinate value and a second signal indicating a Y coordinate value when the magnet is inclined towards the magnetoelectric devices;

generating a third signal indicating a Z coordinate value when the magnet is moved vertically towards the magnetoelectric devices; and processing the first signal, the second signal, and the third signal to determine an XYZ coordinate value for display.

* * * * *